in text US011785355B2

(12) United States Patent
Jang et al.

(10) Patent No.: US 11,785,355 B2
(45) Date of Patent: Oct. 10, 2023

(54) IMAGE SENSOR CONFIGURED TO IMPROVE ARTIFACT IN BINNING MODE

(71) Applicant: SAMSUNG ELECTRONICS CO., LTD., Suwon-si (KR)

(72) Inventors: Young Heub Jang, Suwon-si (KR); Kundong Kim, Suwon-si (KR); Sungsu Kim, Suwon-si (KR); Hyungwook Kim, Suwon-si (KR); Jiyun Bang, Suwon-si (KR); Hankook Cho, Suwon-si (KR); Jaehyuk Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/474,740

(22) Filed: Sep. 14, 2021

(65) Prior Publication Data

US 2022/0124264 A1 Apr. 21, 2022

(30) Foreign Application Priority Data

Oct. 19, 2020 (KR) .................. 10-2020-0135299

(51) Int. Cl.
*H04N 25/46* (2023.01)
*H04N 25/702* (2023.01)

(52) U.S. Cl.
CPC ........... *H04N 25/46* (2023.01); *H04N 25/702* (2023.01)

(58) Field of Classification Search
CPC .. H04N 5/347; H04N 5/3696; H04N 5/36961; H04N 5/345; H04N 5/359; H04N 5/3597; H04N 5/357; H04N 5/378; H04N 9/0455; H04N 25/46; H04N 25/702; H04N 25/704; H04N 25/44; H04N 25/62; H04N 25/626; H04N 25/11; H04N 25/60; H04N 25/75; G06T 5/006
See application file for complete search history.

(56) References Cited

U.S. PATENT DOCUMENTS

| 7,929,807 | B2 | 4/2011 | Andersen |
| 8,767,117 | B2 | 7/2014 | Miyashita et al. |
| 9,686,485 | B2 | 6/2017 | Agranov et al. |
| 9,813,687 | B1 | 11/2017 | Okazawa |
| 10,484,627 | B2 | 11/2019 | Zhou |

(Continued)

FOREIGN PATENT DOCUMENTS

JP 2019-161577 A 9/2019

*Primary Examiner* — Michael E Teitelbaum
(74) *Attorney, Agent, or Firm* — Sughrue Mion, PLLC

(57) ABSTRACT

An image processing device includes an image sensor including a pixel array that includes a first pixel group, and a correlated double sampling circuit. The first pixel group includes a first plurality of normal pixels, a second plurality of normal pixels, and at least one first phase detection pixel. The correlated double sampling circuit is configured to generate first video data, based on charges of the first plurality of normal pixels, generate second video data, based on charges of the second plurality of normal pixels, and generate first phase detection data, based on an output of the at least one first phase detection pixel. The image processing device further includes an image signal processor configured to apply a first weight to the generated first video data, and apply a second weight to the generated second video data.

10 Claims, 21 Drawing Sheets

(56) References Cited

U.S. PATENT DOCUMENTS

| | | | |
|---|---|---|---|
| 2013/0120609 A1* | 5/2013 | Okazawa | H04N 5/36961 |
| | | | 348/223.1 |
| 2019/0222784 A1 | 7/2019 | Ise et al. | |
| 2019/0259795 A1 | 8/2019 | Jang et al. | |
| 2021/0112215 A1* | 4/2021 | Kuo | H04N 5/3456 |
| 2021/0126033 A1* | 4/2021 | Yang | H01L 27/14627 |

\* cited by examiner

FIG. 6

| R\C | 1 | 2 | 3 | 4 | 5 | 6 | 7 | 8 | 9 | 10 | 11 | 12 |
|---|---|---|---|---|---|---|---|---|---|---|---|---|
| 1 | Gr | Gr | Gr | R | R | R | Gr | Gr | Gr | R | R | R |
| 2 | Gr | Gr | Gr | R | R | R | Gr | Gr | Gr | R | R | R |
| 3 | Gr | Gr | Gr | R | R | R | Gr | Gr | Gr | R | R | R |
| 4 | B | B | B | Gb | Gb | Gb | B | B | B | Gb | Gb | Gb |
| 5 | B | B | B | Gb | Gb | Gb | B | B | Gb/R | Gb | Gb | Gb |
| 6 | B | B | B | Gb | Gb | Gb | B | B | Gb/R | Gb | Gb | Gb |
| 7 | Gr | Gr | Gr | R | R | R | Gr | Gr | Gr | R | R | R |
| 8 | Gr | Gr | Gr | R | R | R | Gr | Gr | Gr | R | R | R |
| 9 | Gr | Gr | Gr | R | R | R | Gr | Gr | Gr | R | R | R |
| 10 | B | B | B | Gb | Gb | Gb | B | B | B | Gb | Gb | Gb |
| 11 | B | B | B | Gb | Gb | Gb | B | B | B | Gb | Gb | Gb |
| 12 | B | B | B | Gb | Gb | Gb | B | B | B | Gb | Gb | Gb |

112

Pixel Data

PDG3, PDG4

FIG. 14

IMAGE SENSOR CONFIGURED TO IMPROVE ARTIFACT IN BINNING MODE

CROSS-REFERENCE TO RELATED APPLICATION

This application is based on and claims priority under 35 U.S.C. § 119 to Korean Patent Application No. 10-2020-0135299 filed on Oct. 19, 2020, in the Korean Intellectual Property Office, the disclosure of which is incorporated by reference herein in its entirety.

BACKGROUND

The disclosure relates to an image sensor, and more particularly, relate to a method of improving an image quality of a pixel group associated with a phase detection pixel of the image sensor operating in a binning mode.

An image sensor may be classified as a charge coupled device (CCD) image sensor, a complementary metal-oxide semiconductor (CMOS) image sensor (CIS), etc. The CMOS image sensor includes pixels formed of CMOS transistors and converts light energy to an electrical signal by using a photoelectric conversion element included in each pixel. The CMOS image sensor obtains information about a captured/photographed image by using the electrical signal generated at each pixel.

As the number of pixels increases and a pixel size is reduced, various pixel arrays and various processing techniques are being developed to optimally operate an image sensor in a high-illuminance environment and a low-illuminance environment. For example, in the high-illuminance environment, an image of a full size may be provided to a user through a sufficient amount of light. However, in the low-illuminance environment, an image, a size of which is reduced due to a method such as binning, may be provided to the user.

An image sensor may obtain phase detection data for phase detection auto-focus (PDAF) for focusing an object. However, an artifact (or an image artifact) that causes a decrease of an image quality may easily occur at pixels adjacent to phase detection pixels for obtaining phase information of an object. Accordingly, a technique for removing an artifact occurring around a phase detection pixel when the image sensor operates in a binning mode may be needed.

SUMMARY

Provided are an image sensor and a method of improving an artifact of a pixel group including a phase detection pixel of the image sensor operating in a binning mode.

According to embodiments, an image processing device includes an image sensor including a pixel array that includes a first pixel group, and a correlated double sampling circuit. The first pixel group includes a first plurality of normal pixels, a second plurality of normal pixels, and at least one first phase detection pixel. The correlated double sampling circuit is configured to generate first video data, based on charges of the first plurality of normal pixels, generate second video data, based on charges of the second plurality of normal pixels, and generate first phase detection data, based on an output of the at least one first phase detection pixel. The image processing device further includes an image signal processor configured to apply a first weight to the generated first video data, apply a second weight to the generated second video data, and generate first phase detection pixel-corrected video data for the first pixel group, based on the first video data to which the first weight is applied and the second video data to which the second weight is applied.

According to embodiments, an image processing device includes a pixel array including a first pixel group including a first plurality of normal pixels and at least one first phase detection pixel, and a second pixel group including a second plurality of normal pixels and at least one second phase detection pixel. The image processing device further includes an image sensor configured to generate first video data, based on charges of the first plurality of normal pixels, generate second video data, based on charges of the second plurality of normal pixels, generate first phase detection data, based on an output of the at least one first phase detection pixel, and generate second phase detection data, based on an output of the at least one second phase detection pixel. The image processing device further includes an image signal processor configured to select the generated first video data as first phase detection pixel-corrected video data for the first pixel group, and select the generated second video data as second phase detection pixel-corrected video data for the second pixel group.

According to embodiments, an image processing device includes a pixel array including a first pixel group including a first plurality of normal pixels and a first phase detection pixel, and a second pixel group including a second plurality of normal pixels and a second phase detection pixel. The image processing device further includes a correlated double sampling circuit configured to generate first video data, based on charges of the first plurality of normal pixels, generate second video data, based on charges of the second plurality of normal pixels, generate first phase detection data, based on an output of the first phase detection pixel, and generate second phase detection data, based on an output of the second phase detection pixel. The image processing device further includes an image signal processor configured to select the generated first video data as first phase detection pixel-corrected video data for the first pixel group, and select the generated second video data as second phase detection pixel-corrected video data for the second pixel group.

BRIEF DESCRIPTION OF THE DRAWINGS

The above and other aspects, features, and advantages of embodiments of the disclosure will be more apparent from the following description taken in conjunction with the accompanying drawings.

FIG. 6 illustrates a pixel map based on image data output from the image sensor including the pixel array of FIG. 3.

FIG. 14 illustrates a pixel map based on image data output from the image sensor including the pixel array of FIG. 13.

DETAILED DESCRIPTION

Below, embodiments of the disclosure may be described in detail and clearly to such an extent that one skilled in the art easily implements the disclosure.

Components that are described in the detailed description with reference to the terms "unit," "module," "block," "~er or ~or," etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
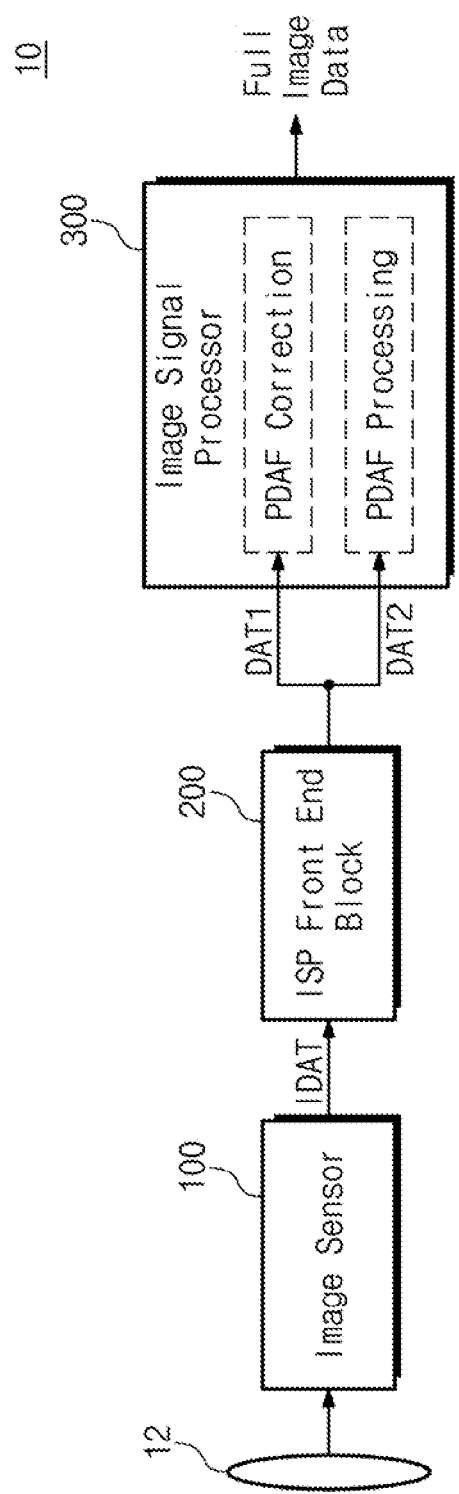
FIG. 1 illustrates a diagram of an image processing device according to embodiments.

FIG. 1 illustrates a diagram of an image processing device 10 according to embodiments. The image processing device 10 may be implemented as a part of various electronic devices such as a smartphone, a digital camera, a laptop computer, and a desktop computer. The image processing device 10 may include a lens 12, an image sensor 100, an image signal processor (ISP) front end block 200, and an image signal processor 300.

The lens 12 may receive a light reflected by an object, a scenery, etc. targeted for photographing. The lens 12 may be movable, for example, by an actuator. When a location of the lens 12 changes according to the movement of the lens 12, a focal distance of the lens 12 may change. As such, a focus on the object may be adjusted.

The image sensor 100 may include normal pixels for obtaining color information about the object. The normal pixels of the image sensor 100 may generate electrical signals based on the light received through the lens 12. The image sensor 100 may further include phase detection pixels for obtaining phase information about the object. The image sensor 100 may include the phase detection pixels for adjusting a focal distance. The phase detection pixels of the image sensor 100 may generate electrical signals, which are used to perform phase detection auto-focus (PDAF), based on the light received through the lens 12. The image sensor 100 may output image data IDAT including the color information and the phase information about the object.

One lens 12 and one image sensor 100 are illustrated in FIG. 1. However, in another example, the image processing device 10 may include a plurality of lenses, a plurality of ISP front end blocks, and a plurality of image sensors. The plurality of image sensors may be provided to have different functions, different performances, and/or different characteristics. In this case, the image sensors may include lenses having different fields of view (FOV), respectively.

The ISP front end block 200 may perform various pre-processings on signals output from the image sensor 100. For example, the ISP front end block 200 may split the image data IDAT into first data DAT1 (e.g., video data) associated with a color of an object and second data DAT2 (e.g., phase detection data) associated with a phase of the object, to be easily processed by the image signal processor 300. In addition, the ISP front end block 200 may perform crosstalk compensation, auto dark level compensation (ADLC) for removing a fixed pattern noise (FPN), etc. on the signals output from the image sensor 100.

The image signal processor 300 may perform various processing on the data processed by the ISP front end block 200. For example, in the high-illuminance environment, a host device (e.g., an application processor) may allow the image processing device 10 to operate in a normal mode (or a re-mosaic mode), and outputs of all pixels of the pixel array in the image sensor 100 may be individually used. In contrast, in the low-illuminance environment, the host device may allow the image processing device 10 to operate in the binning mode.

When the image processing device 10 operates in the binning mode, the image signal processor 300 may perform a phase detection pixel (PDAF) correction operation in which various weights are applied to binning results and may calculate a value associated with a color of a pixel group including a phase detection pixel based on the PDAF correction result. Here, a pixel group may mean a set of pixels sharing at least one floating diffusion region, and the pixel group may include normal pixels and at least one phase detection pixel. In addition, the image signal processor 300 may perform PDAF processing for organizing phase detection data. The image signal processor 300 may transfer, to the host device (e.g., an application processor), the organized phase detection data together with phase detection pixel-corrected video data, as full image data.

In addition, the image signal processor 300 may perform the following processing on the first data DAT1 received from the ISP front end block 200: color interpolation, auto white balance, gamma correction, color saturation correction, formatting, bad pixel correction, and hue correction.

In the binning mode, a value associated with a color of a pixel group including a phase detection pixel is calculated with reference to values output from adjacent pixels around the phase detection pixel, thereby causing the artifact. However, the image processing device 10 may utilize binning values of a pixel group itself when calculating a value associated with a color of the pixel group including a phase detection pixel, and thus, the occurrence of the artifact may be suppressed.

Figure 2:
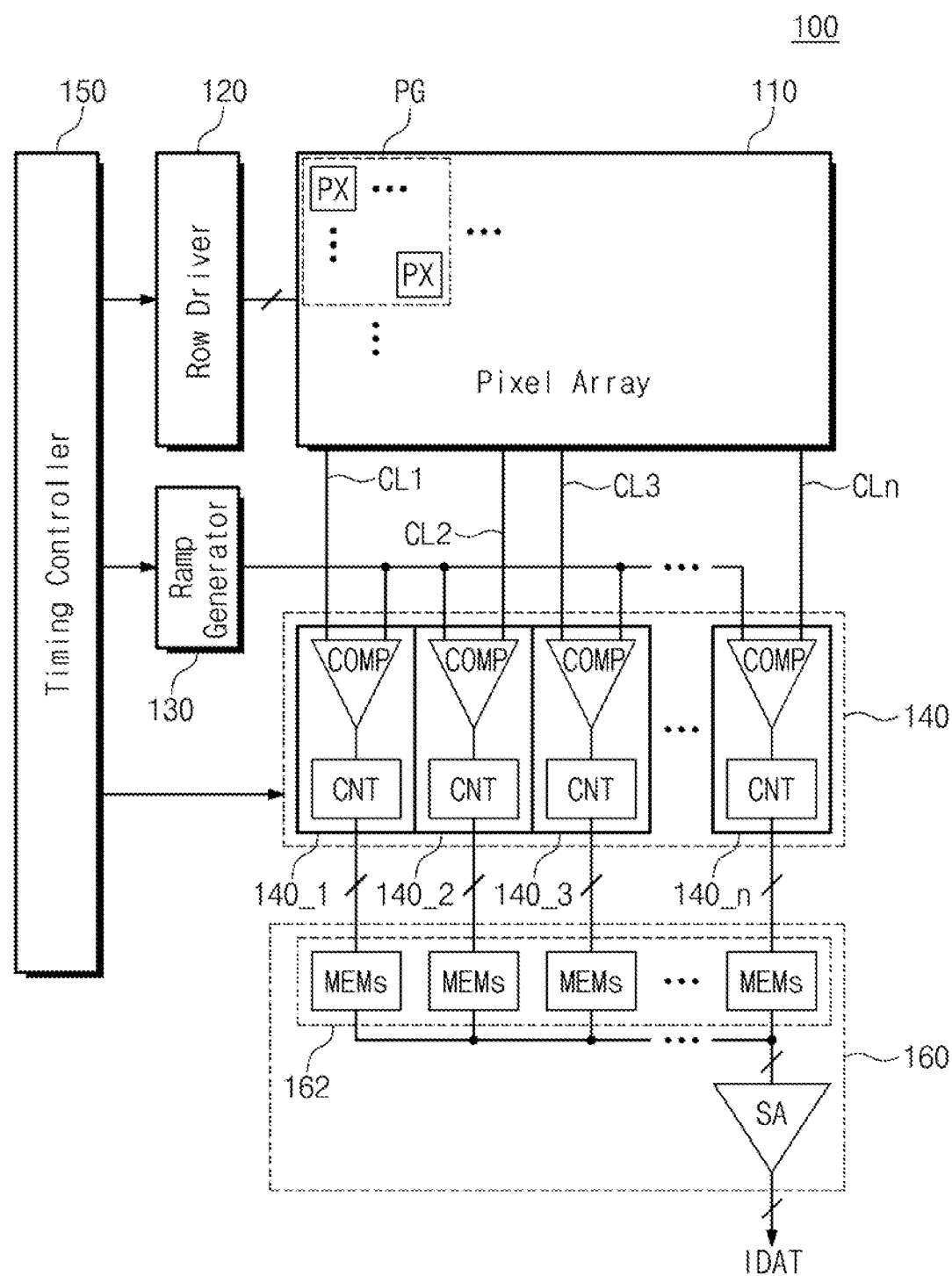
FIG. 2 illustrates a block diagram of an image sensor of FIG. 1.

FIG. 2 illustrates a block diagram of the image sensor 100 of FIG. 1. The image sensor 100 may include a pixel array 110, a row driver 120, a ramp signal generator 130, an analog-to-digital converting block (hereinafter referred to as an "ADC block") 140, a timing controller 150, and a buffer 160.

The pixel array 110 may include a plurality of pixels PX arranged in rows and columns, that is, in the form of a matrix. Each of the plurality of pixels PX may include a photoelectric conversion element. Each of the plurality of pixels PX may sense a light by using the photoelectric conversion element and may convert the sensed light to an electrical signal (hereinafter referred to as a "pixel signal"). For example, the photoelectric conversion element may include a photo diode, a photo transistor, a photo gate, a pinned photo diode, etc.

The plurality of pixels PX of the pixel array 110 may be divided into a plurality of pixel groups PG. Each pixel group PG may include at least two or more pixels. In embodiments, the pixel group PG may include 9 pixels PX arranged in 3 rows and 3 columns or may include 4 pixels PX arranged in 2 rows and 2 columns. However, the number of pixels constituting the pixel group PG is not limited thereto.

Pixels constituting one pixel group PG may share one floating diffusion region or two or more floating diffusion regions. For example, the pixels constituting the pixel group PG may share one floating diffusion region. In this case, pixels of each pixel group PG may be connected in common with one column line (e.g., CL1). Alternatively, the pixels constituting the pixel group PG may share a plurality of floating diffusion regions. In detail, pixels belonging to a first column from among the pixels of the pixel group PG may share a first floating diffusion region, pixels belonging to a second column from among the pixels of the pixel group PG may share a second floating diffusion region, and pixels belonging to a third column from among the pixels of the pixel group PG may share a third floating diffusion region. In this case, in the pixel group PG illustrated in drawing, the pixels belonging to the first column may be connected in common with a column line CL1, the pixels belonging to the second column may be connected in common with a column line CL2, and the pixels belonging to the third column may be connected in common with a column line CL3.

The pixel group PG may include pixels of the same type for outputting information about the same color. For example, the pixel group PG may include red pixels "R" to convert a light of a red spectrum to an electrical signal, green pixels Gr/Gb to convert a light of a green spectrum to an electrical signal, or blue pixels "B" to convert a light of a blue spectrum to an electrical signal. To this end, a plurality of color filters may be formed on the pixel group PG, and thus, a multi-color filter array (multi-CFA) may be implemented.

The row driver 120 may select and drive the rows of the pixel array 110. The row driver 120 may decode an address and/or a control signal generated by the timing controller 150 and may generate control signals for selecting and driving the rows of the pixel array 110. For example, the control signals may include a signal for selecting a pixel, a signal for resetting a floating diffusion region, a signal for selecting a column line, etc.

The ramp signal generator 130 may generate a ramp signal. The ramp signal generator 130 may operate under control of the timing controller 150. For example, the ramp signal generator 130 may operate in response to control signals such as a ramp enable signal and a mode signal. When the ramp enable signal is activated, the ramp signal generator 130 may generate the ramp signal having a slope that is set based on the mode signal.

The ADC block 140 may convert an analog signal (i.e., a pixel signal) output from the pixel array 110 to a digital signal. In embodiments, the ADC block 140 may include a plurality of ADCs 140_1 through 140_n, and each of the ADCs 140_1 through 140_n may include a comparator COMP and a counter CNT. The comparator COMP may compare a pixel signal output through a column line (i.e., one of CL1 through CLn) connected with the comparator COMP with a ramp signal and may output a comparison result. The comparator COMP may operate based on a correlated double sampling (CDS) technique for obtaining a reset signal and an image signal from a pixel signal and extracting a difference between the reset signal and the image signal as an effective signal component.

The counter CNT may count pulses of an output signal of the comparator COMP. For example, the counter CNT may operate in response to various control signals, which are generated by the timing controller 150, such as a counter clock signal, a counter reset signal for controlling a reset of the counter CNT, and an inversion signal for inverting an internal bit of the counter CNT. The counter CNT may count a comparison result signal according to the counter clock signal and may output a counting result as a digital signal.

The counter CNT may include an up/down counter, a bit-wise inversion counter, etc. An operation of the bit-wise inversion counter may be similar to an operation of the up/down counter. For example, the bit-wise inversion counter may perform the following functions: a function to perform only up-counting and a function to convert all internal bits of the counter CNT in response to an input of a signal such that the 1's complement is obtained. The bit-wise inversion counter may perform a reset count and may then invert a result of the reset count to be converted to the 1's complement, that is, a negative value.

The timing controller 150 may generate control signals and/or a clock for controlling operations and/or timings of the row driver 120, the ramp signal generator 130, and the ADC block 140.

The buffer 160 may include a set 162 of memories MEMs and a sense amplifier SA. The memories MEMs may correspond to the ADCs 140_1 through 140_n, respectively. Each of the memories MEMs may store a digital signal output from the corresponding ADC. The sense amplifier SA may sense and amplify the digital signals stored in the memories MEMs. The sense amplifier SA may output the amplified digital signals as image data IDAT. For example, the image data IDAT may include information about a color of an object and information about a phase of the object. For convenience, the ADC block 140 and the buffer 160 is collectively referred to as a "correlated double sampling circuit."

Figure 3:
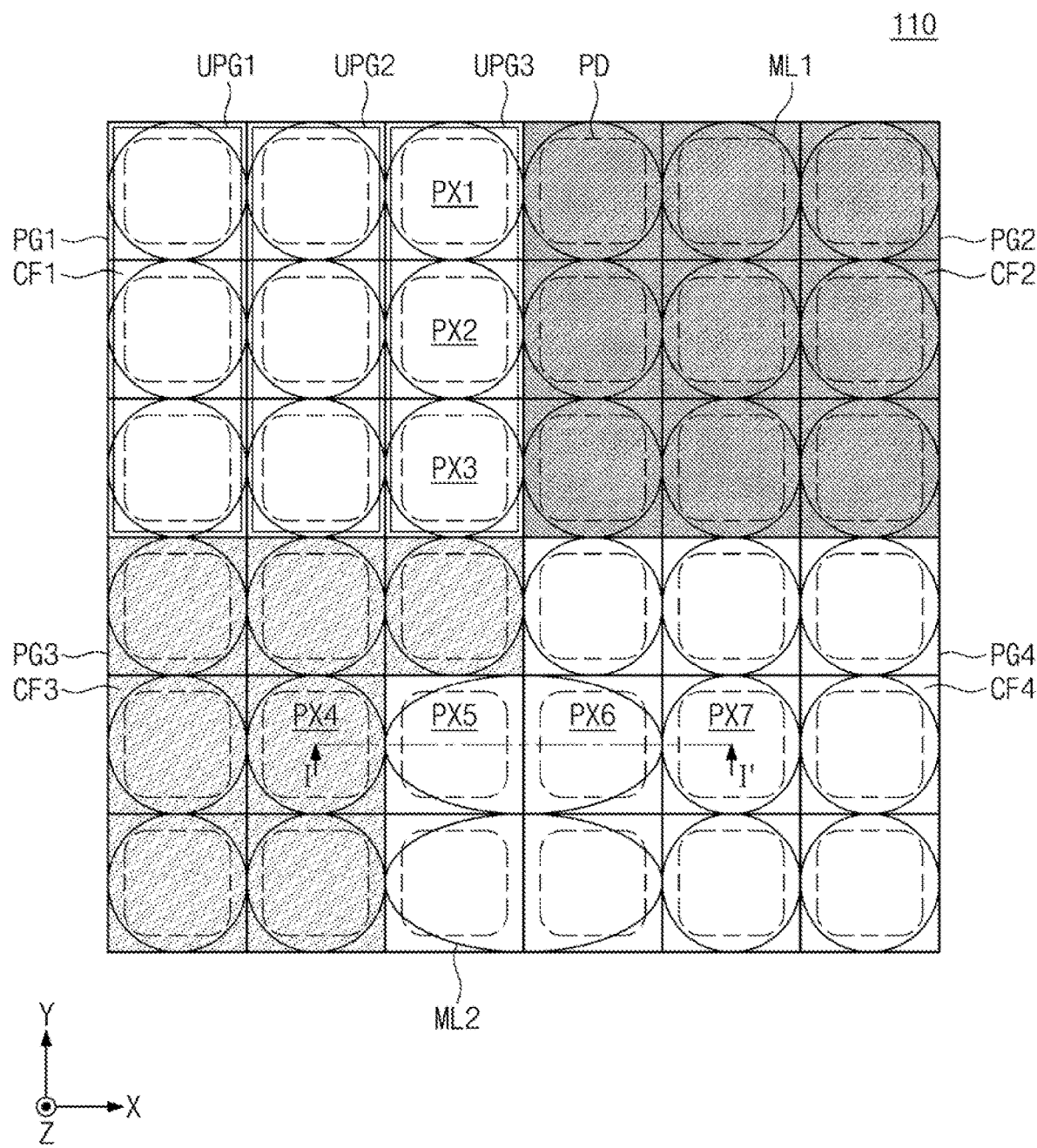
FIG. 3 illustrates a plan view of a pixel array of FIG. 2.

FIG. 3 illustrates a plan view of the pixel array 110 of FIG. 2. The pixel array 110 may include pixel groups PG1 through PG4. The pixel groups PG1 through PG4 may be repeatedly formed on a substrate of the image sensor 100 along the X-axis and the Y-axis. Each of the pixel groups PG1 through PG4 may include 3×3 pixels arranged along the X-axis and the Y-axis. Each pixel may include a photoelectric conversion element PD (refer to FIG. 5).

The arrangement of unit pixel groups UPG1 through UPG3 will be described on the basis of the first pixel group PG1. Each of the unit pixel groups UPG1 through UPG3 may include 3×1 pixels arranged along the X-axis and the Y-axis. A unit pixel group may be defined as a set of pixels sharing the same floating diffusion region. In other words, even though unit pixel groups belong to the same pixel group, a floating diffusion region shared by pixels belonging to one unit pixel group may not be shared by pixels belonging to the remaining unit pixel groups. The unit pixel groups UPG1 through UPG3 may be adjacent to each other in an X-axis direction. Accordingly, as illustrated in drawing, in the case in which one pixel group includes three unit pixel groups, one pixel group may include 3×3 pixels arranged along the X-axis and the Y-axis.

The color filters CF1 through CF4 for passing a light of a wavelength band may be respectively formed on the pixel groups PG1 through PG4. For example, the first color filter CF1 and the fourth color filter CF4 may pass a green light, the second color filter CF2 may pass a red light, and the third color filter CF3 may pass a blue light. Embodiments is illustrated as the third color filter CF3 is not formed under a second micro lens ML2 that are formed on a plurality of pixels. However, in embodiments, unlike the embodiments illustrated in FIG. 3, the third color filter CF3 may be formed above the third pixel group PG3 covered by the second micro lens ML2, and the fourth color filter CF4 may be formed above the fourth pixel group PG4 covered by the second micro lens ML2.

A micro lens ML may be formed on a color filter formed on each pixel. In embodiments, the first micro lenses ML1 may be formed above normal pixels (e.g., PX1 through PX4, and PX7), and the second micro lens ML2 may be formed above a pair of phase detection pixels (e.g., PX5 and PX6). For example, the second micro lens ML2 may be formed above a pixel (e.g., PX5) of the third pixel group PG3 associated with the blue light and above a pixel (e.g., PX6) of the fourth pixel group PG4 associated with the green light.

The pixel groups PG1 through PG4 illustrated in FIG. 3 may be repeatedly disposed, but a part of the pixel groups PG1 through PG4 repeatedly disposed may not include phase detection pixels. For example, a ratio of the number of phase detection pixels to the number of all pixels may be, but is not limited to, 1:36.

Figure 4:
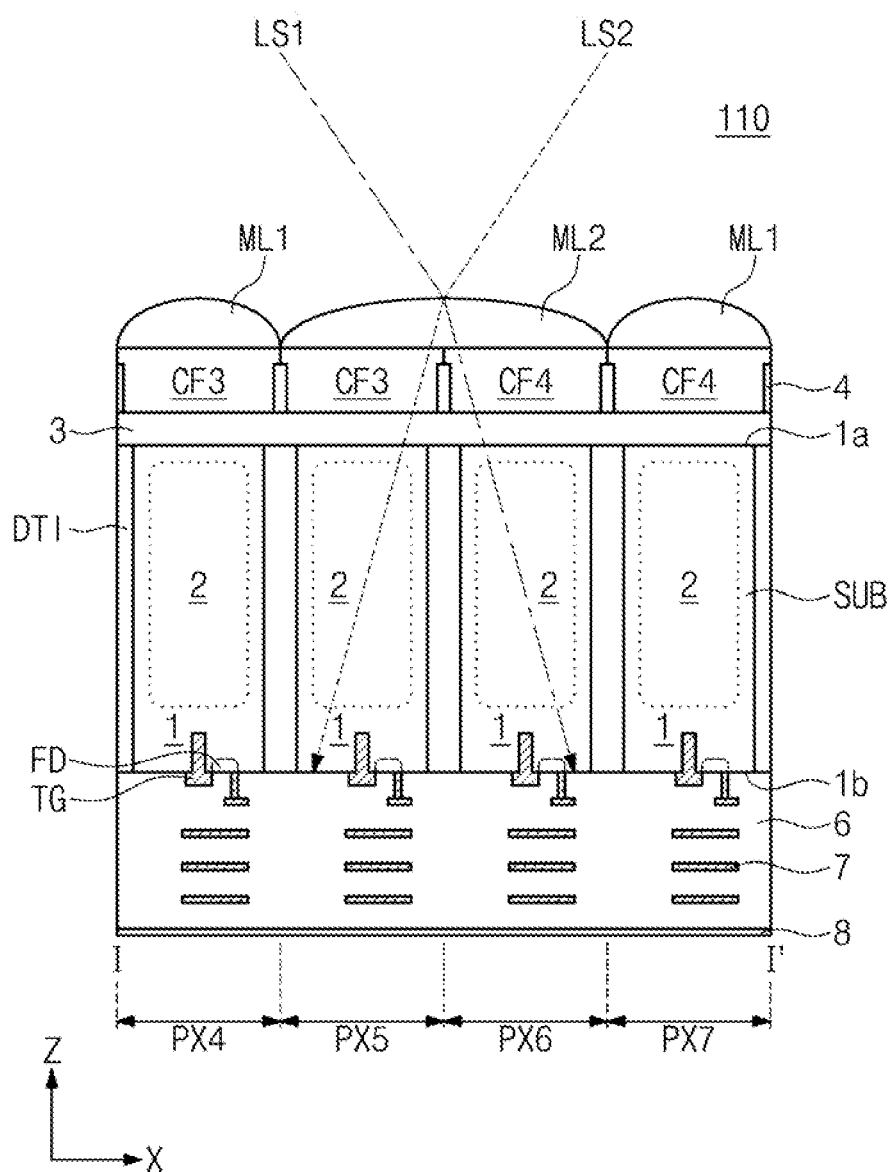
FIG. 4 illustrates a cross-sectional view of the pixel array taken along line I-I' of FIG. 3.

FIG. 4 illustrates a cross-sectional view of the pixel array 110 taken along line I-I' of FIG. 3.

The pixel array 110 may include a substrate SUB including a first surface 1a and a second surface 1b facing away from each other. The substrate SUB may include a single crystalline substrate or an epitaxial layer. The substrate SUB may include a region 1 doped by an impurity of a first conductive type (e.g., P-type) and a region 2 doped by an impurity of a second conductive type (e.g., N-type). The first doping region 1 and the second doping region 2 may form the photoelectric conversion element PD of each pixel. When a light is incident on the photoelectric conversion element PD through the micro lens ML1 or ML2 and a color filter (e.g., one of CF1 through CF4), electron-hoe pairs EHP corresponding to the intensity of absorbed light may be generated.

A fixed charge layer 3 may be formed on the first surface 1a of the substrate SUB. The fixed charge layer 3 may include various kinds of metal oxide and/or metal fluoride. For example, the fixed charge layer 3 may include at least one or more of $Al_2O_3$, $HfO_x$ (X being a natural number), $SiO_2$, and SiN. An interlayer insulating layer 6 may be formed on the second surface 1b of the substrate SUB. For example, the interlayer insulating layer 6 may include a plurality of insulating layers. The interlayer insulating layer 6 may be covered with a passivation layer 8. For example, the passivation layer 8 may include silicon nitride.

Each of the pixels PX1 through PX7 may include a floating diffusion region FD and a transfer transistor TG. In addition, each of the pixels PX1 through PX7 may further include a reset transistor, a drive transistor, and a select transistor. The pixels PX1 through PX7 may be separated from each other by a deep trench isolator (DTI). When a transfer signal is applied to a gate electrode of the transfer transistor TG, the transfer transistor TG may be turned on, and thus, charges generated in the first doping region 1 and the second doping region 2 may move to the floating diffusion region FD. The charges of the floating diffusion region FD may be transferred to the outside through internal wires 7.

Separations 4 may be formed on the fixed charge layer 3. The separations 4 may include tungsten, titanium, etc. The separations 4 may prevent the crosstalk between adjacent pixels. That is, the separations 4 may prevent a light passing through a color filter from affecting another color filter. In a plan view, the separations 4 may be formed in the shape of a grid. The color filters CF1 through CF4 may be formed on the fixed charge layer 3 and between the separations 4. The micro lenses ML1 and ML2 may be formed on the color filters CF1 through CF4. For example, the first color filter CF1 may be formed above one pixel, and the second color filter CF2 may be formed above two pixels of different types.

A light incident onto the image processing device 10 (refer to FIG. 1) may be refracted by the lens 12 (refer to FIG. 1) and may be then incident onto the pixel array 110 along a path marked by a light LS1 and a light LS2. For example, the light LS1 may be refracted by the second micro lens ML2 and may be then incident onto the sixth pixel PX6, and the light LS2 may be refracted by the second micro lens ML2 and may be then incident onto the fifth pixel PX5. As such, images of different phases may be obtained with respect to the same object, and phase detection auto-focus may be performed on the object based on a phase difference.

Figure 5:
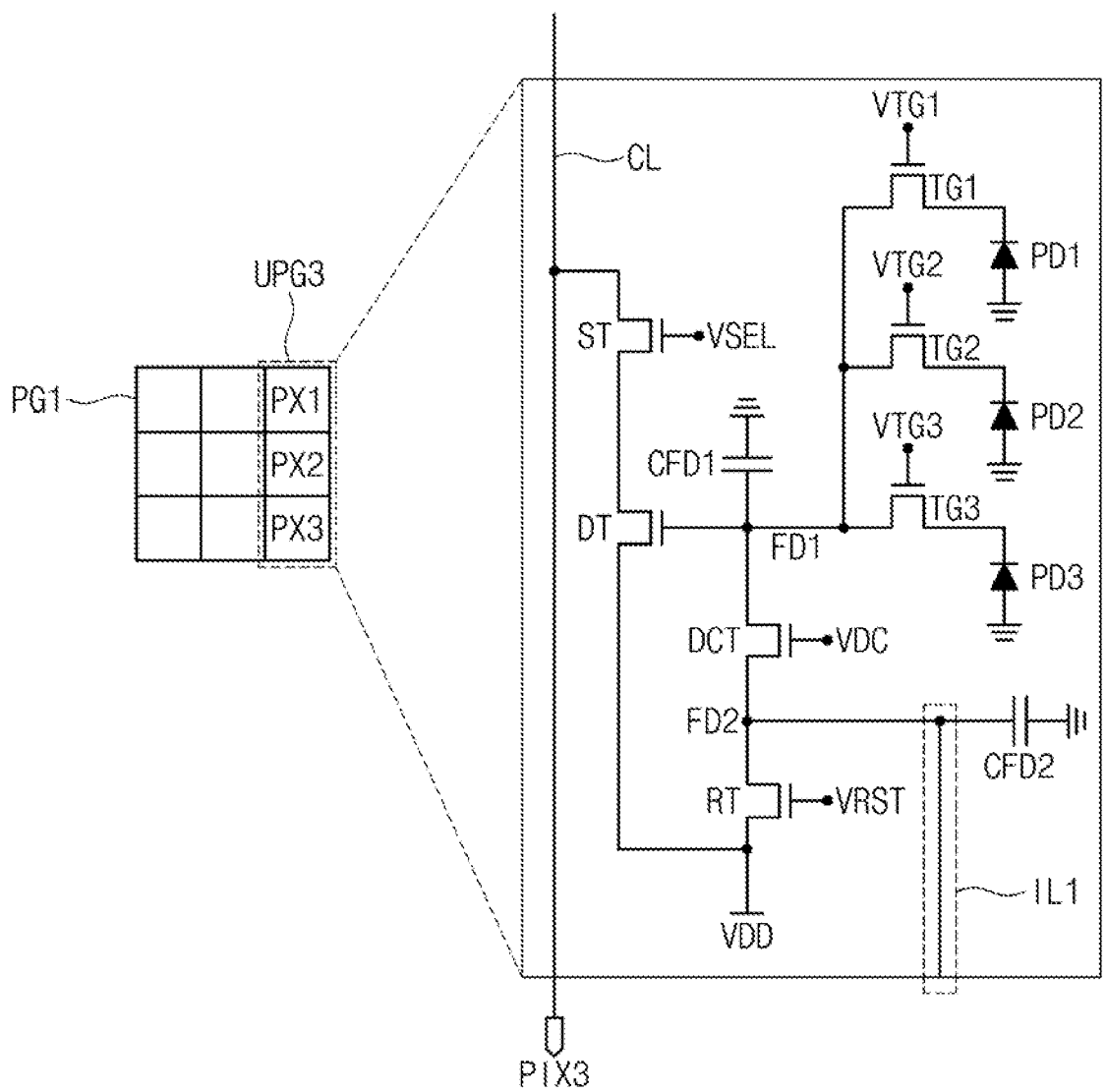
FIG. 5 illustrates a circuit diagram of one of pixel groups of FIG. 3.

FIG. 5 illustrates a circuit diagram of one of the pixel groups PG1 through PG4 of FIG. 3. In embodiments, the description will be given on the basis of the third unit pixel group UPG3 of the first pixel group PG1 of FIG. 3. The third unit pixel group UPG3 may include the pixels PX1 through PX3. The third unit pixel group UPG3 may include photoelectric conversion elements PD1 through PD3, transfer transistors TG1 through TG3, a dual conversion transistor DCT, a reset transistor RT, a drive transistor DT, and a select transistor ST.

The first pixel PX1 may include the first photoelectric conversion element PD1 and the first transfer transistor TG1. The second pixel PX2 may include the second photoelectric conversion element PD2 and the second transfer transistor TG2, and the third pixel PX3 may include the third photoelectric conversion element PD3 and the third transfer transistor TG3. The first through third pixels PX1 through PX3 may share the reset transistor RT, the drive transistor DT, and the select transistor ST.

The transfer transistors TG1 through TG3 may transfer charges generated (or integrated) by the photoelectric conversion elements PD1 through PD3 to a first floating diffusion region FD1. For example, during a period in which the transfer transistor TG1 is turned on by a transfer signal VTG1 received from the row driver 120 (refer to FIG. 1), charges provided from the photoelectric conversion element PD1 may be integrated in the first floating diffusion region FD1. As in the above description, each of the transfer transistors TG2 to TG3 may transfer charges generated (or integrated) by the corresponding photoelectric conversion element PD2 or PD3 to the first floating diffusion region FD1. First ends of the transfer transistors TG1 through TG3 may be respectively connected with the photoelectric conversion elements PD1 through PD3, and second ends of the transfer transistors TG1 through TG3 may be connected in common with the first floating diffusion region FD1.

The first floating diffusion region FD1 may integrate charges converted by any one or any combination of the photoelectric conversion elements PD1 through PD3. In embodiments, a capacitance of the first floating diffusion region FD1 is marked by a first capacitance CFD1. The first floating diffusion region FD1 may be connected with a gate terminal of the drive transistor DT that operates as a source follower amplifier. As such, a voltage potential corresponding to the amount of charges integrated in the first floating diffusion region FD1 may be formed.

The reset transistor RT may be turned on by a reset signal VRST and may provide a reset voltage (e.g., a power supply voltage VDD) to the first floating diffusion region FD1. As such, the charges integrated in the first floating diffusion region FD1 may move to a power node to which the power supply voltage VDD is supplied, and a voltage of the first floating diffusion region FD1 may be reset.

The drive transistor DT may amplify a change of an electrical potential of the first floating diffusion region FD1 and may generate a voltage (i.e., a pixel signal PIX3) corresponding to a result of the amplification. The select transistor ST may be driven by a selection signal VSEL and may select a pixel to be read in units of a row. As the select transistor ST is turned on, the pixel signal PIX3 may be output through a column line CL.

In a general environment, because the first floating diffusion region FD1 is not easily saturated, there may be no need to increase the capacitance (i.e., CFD1) of the first floating diffusion region FD1. However, in the high-illuminance environment, the first floating diffusion region FD1 may be easily saturated. Accordingly, to prevent the saturation, the first floating diffusion region FD1 and a second floating diffusion region FD2 may be electrically connected by turning on the dual conversion transistor DCT by a dual conversion signal VDC, and thus, a capacitance of the floating diffusion regions FD1 and FD2 may be extended to a sum of the first capacitance CFD1 and a second capacitance CFD2.

In addition, the second floating diffusion region FD2 may be electrically connected with a floating diffusion region of an adjacent unit pixel group through a line ILL In this case, the capacitance of the first floating diffusion region FD1 may be further extended. In this case, the third unit pixel group UPG3 may further include a switching element (e.g., a switching element such as the dual conversion transistor DCT) for electrically connecting the second floating diffusion region FD2 with a floating diffusion region of an adjacent unit pixel group.

In embodiments, in the case in which the image processing device 10 operates in the normal mode, the pixel signals PIX3 may be respectively output from the pixels PX1 through PX3 of the third unit pixel group UPG3 and may be individually used. That is, the timing controller 150 (refer to FIG. 2) may control transfer signals VTG1 through VTG3 such that the transfer transistors TG1 through TG3 are respectively turned on at different timings. Accordingly, the pixel signals PIX3, each of which corresponds to the amount of charges converted by each of the photoelectric conversion elements PD1 through PD3, may be output at different timings.

In embodiments, in the case in which the image processing device 10 operates in the binning mode, charges converted by the pixels PX1 through PX3 of the third unit pixel group UPG3 may be simultaneously used. For example, as the transfer transistors TG1 through TG3 may be turned on at the same time or at different times, charges converted by the pixels PX1 through PX3 may be integrated in the first floating diffusion region FD1, and the pixel signal PIX3 corresponding to a sum of the charges converted by the pixels PX1 through PX3 may be output through the column line CL.

FIG. 6 illustrates a pixel map 112 based on image data output from the image sensor 100 (refer to FIG. 2) including the pixel array 110 of FIG. 3. The pixel map 112 illustrated in FIG. 6 may be a pixel map output from the image processing device 10 operating in the normal mode. The image data IDAT output from the image sensor 100 may constitute a pixel map of one frame. The pixel map 112 may include 144 pixel data disposed in 12 rows and 12 columns, and each pixel data that are output of the image sensor 100 may have a digital value.

Pixel data may be one of video data including information about a color of an object and phase detection data including information about a phase of the object. For example, each of 140 pixel data (i.e., video data) output from 140 normal pixels may have one of a value "R" associated with a red color, a value Gr or Gb associated with a green color, and a value "B" associated with a blue color. 4 pixel data (i.e., phase detection data) output from 4 phase detection pixels may have values L00, L10, R00, and R10 associated with a phase. In embodiments, pixel data groups PDG3 and PDG4 may be based on pixel signals output from pixels of the pixel groups PG3 and PG4 of FIG. 3, and the pixel data L00 and R00 may be based on pixel signals output from the pixels PX5 and PX6 of FIGS. 3 and 4.

The image signal processor 300 may perform re-mosaic for generating an image of a Bayer pattern, by using pixel data (in detail, video data) of the pixel map 112. The image signal processor 300 may perform phase detection auto-focus (PDAF) by using the pixel data L00, L10, R00, and R10. The re-mosaic and the phase detection auto-focus are well known to one skilled in the art, and thus, additional description will be omitted to avoid redundancy.

Figure 7:
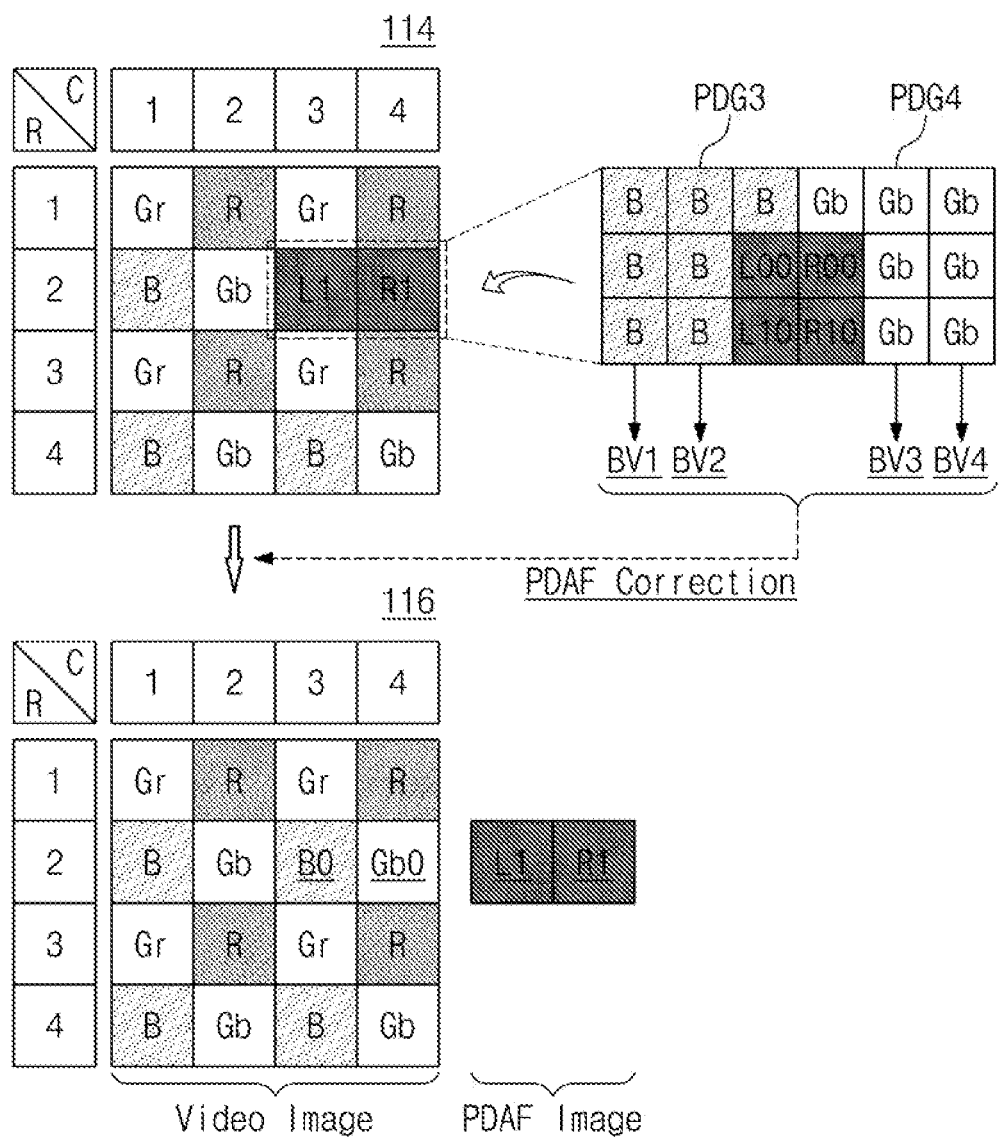
FIG. 7 illustrates pixel maps processed by an image signal processor of FIG. 1.

FIG. 7 illustrates pixel maps 114 and 116 processed by the image signal processor 300 of FIG. 1. The pixel maps 114 and 116 illustrated in FIG. 7 may be associated with the image processing device operating in the binning mode. For better understanding, the description will be given with reference to FIGS. 1 and 3 together.

In embodiments, in the binning mode, the image sensor 100 may perform analog binning for each unit pixel group, and the image signal processor 300 may perform digital binning on analog binning results of unit pixel groups of a pixel group to generate new pixel data (i.e., video data). A process of outputting charges converted by photoelectric conversion elements (e.g., PD1 through PD3) included in one unit pixel group (e.g., UPG3 of FIG. 5) as one pixel (e.g., PIX3) is described with reference to FIG. 5 in detail, and thus, additional description will be omitted to avoid redundancy.

In the case of generating a pixel map in the binning mode, pixel data (e.g., "B" and Gb of the pixel data groups PDG3 and PDG4) output from normal pixels of a pixel group (e.g., PG3 or PG4) including a phase detection pixel are not used. That is, binning is only performed on the phase detection data L00, L01, R00, and R01 output from pixel groups including phase detection pixels. As such, phase detection data L1 at the second row and the third column of the pixel map 114 may be generated based on the binning of the phase detection data L00 and L10, and phase detection data R1 at the second row and the fourth column of the pixel map 114 may be generated based on the binning of the phase detection data R00 and R10.

The image signal processor 300 uses peripheral video data "B" of the pixel map 114 to generate video data at the second row and the third column of the pixel map 114 and uses peripheral video data Gb of the pixel map 114 to generate video data at the second row and the fourth column of the pixel map 114. That is, in the case of a pixel group including a phase detection pixel, because only peripheral video data are used without using video data of the phase detection pixel, the artifact occurs.

However, the image signal processor 300 uses binning results of normal pixels of a pixel group including a phase detection pixel when generating the pixel map 114. In addition, in the case of using the binning results of the normal pixels of the pixel group including the phase detection pixel, the image signal processor 300 may apply a weight to each binning result.

For example, the image signal processor 300 may generate video data B0 at the second row and the third column of the pixel map 116 by performing phase detection pixel correction for applying different weights to a binning value BV1 output from one unit pixel group and a binning value BV2 output from another unit pixel group. As in the above description, the image signal processor 300 may generate video data Gb0 at the second row and the fourth column of the pixel map 116 by performing phase detection pixel correction for applying different weights to a binning value BV3 output from one unit pixel group and a binning value BV4 output from another unit pixel group.

As a result, there may be obtained a video image that is based on video data output from normal pixels of a pixel group including a phase detection pixel, and there may be obtained a phase detection image PDAF image that is in advance separated at the ISP front end block 200. The video image and the phase detection image thus obtained may be provided to a host (e.g., an application processor), and a complete image in which phase detection auto-focus is performed may be provided to the user by the host.

Figure 8:
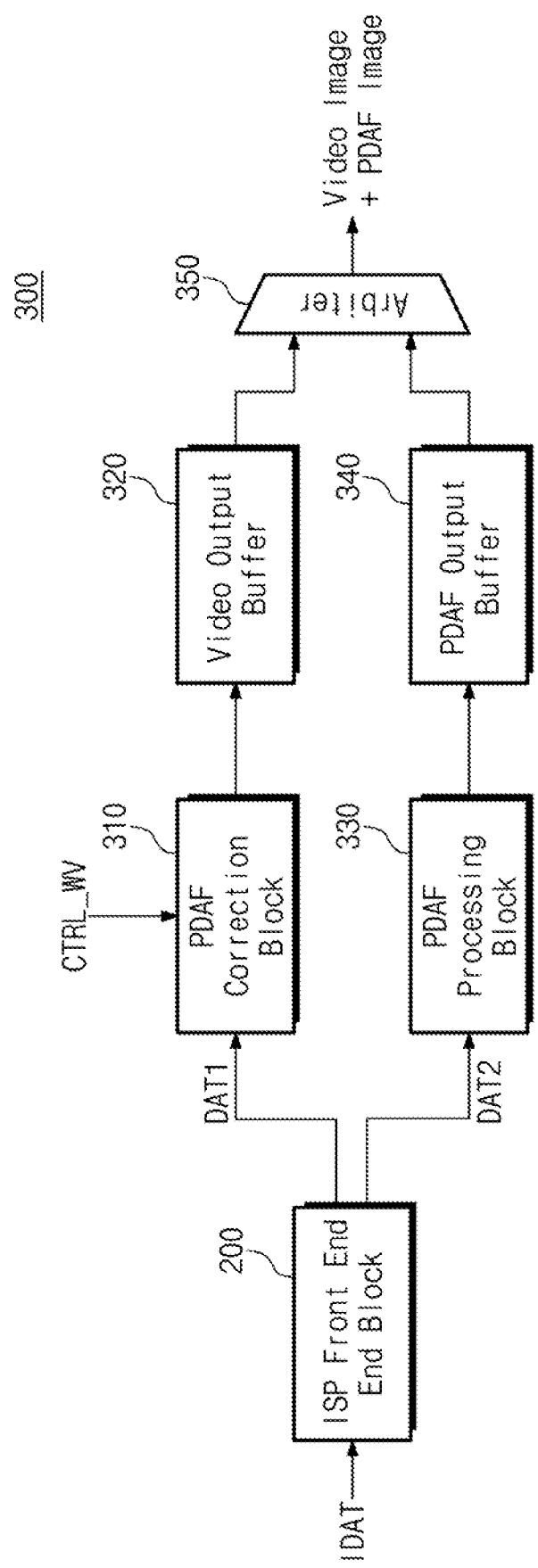
FIG. 8 illustrates a block diagram of the image signal processor of FIG. 1.
Figure 9:
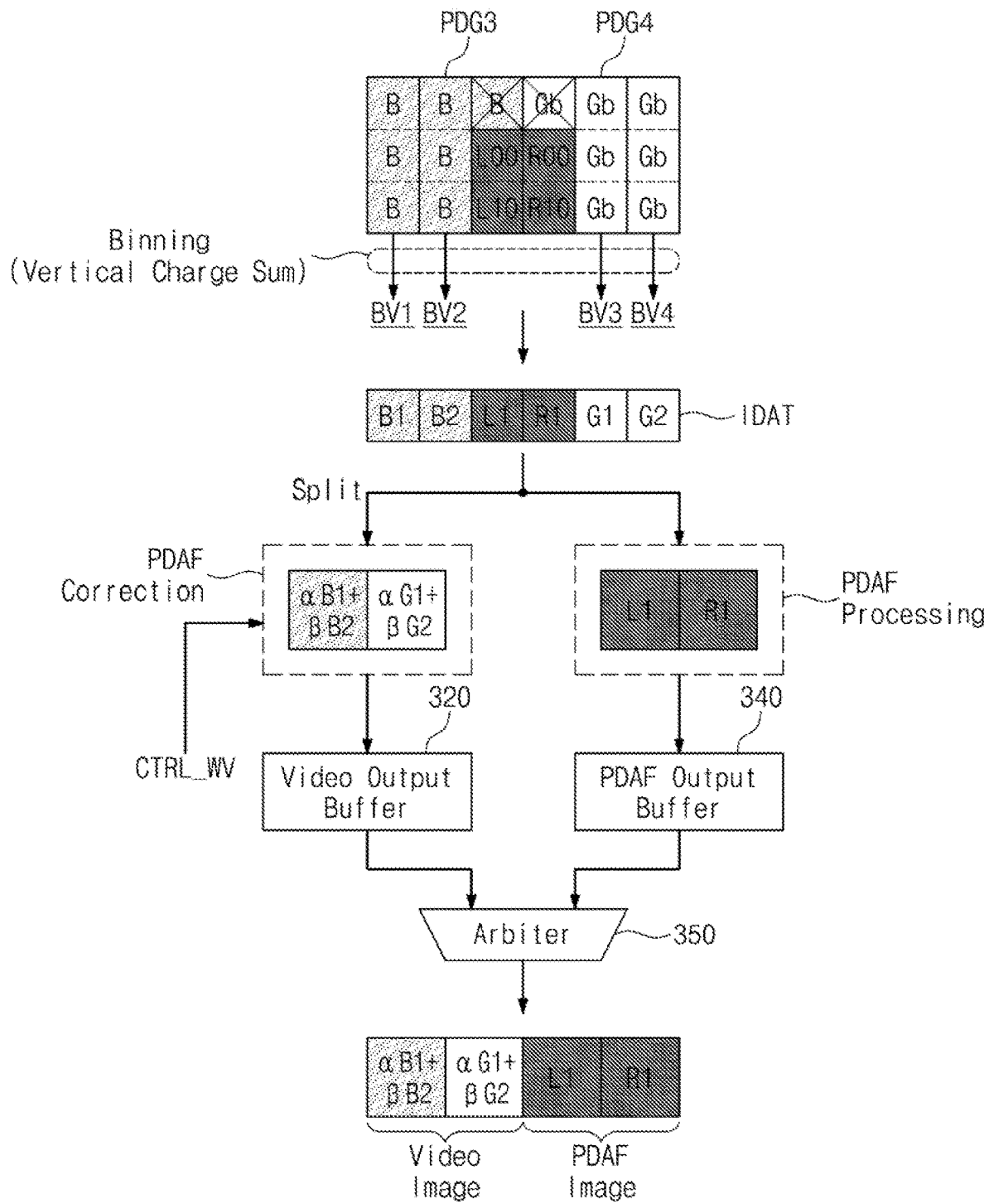
FIG. 9 illustrates phase detection pixel correction performed on an output of the image sensor including the pixel array of FIGS. 3 to 5.

FIG. 8 illustrates a block diagram of the image signal processor 300 of FIG. 1. FIG. 9 illustrates phase detection pixel correction performed on an output of the image sensor including the pixel array 110 of FIGS. 3 and 5. Referring to FIG. 8, the image signal processor 300 may include a phase detection pixel correction block 310, a video output buffer 320, a phase detection processing block 330, a phase detection output buffer 340, and an arbiter 350. For better understanding, the ISP front end block 200 is illustrated together in FIG. 8. How the image processing device operates in the binning mode will be described with reference to FIGS. 1, 2, 3, 5, 8, and 9.

The pixel data groups PDG3 and PDG4 illustrated in FIG. 9 may correspond to the pixel groups PG3 and PG4 of FIG. 3. The image sensor 100 may perform analog binning (i.e., a vertical charge sum) for summing charges converted by photoelectric conversion elements of a unit pixel group composed of only normal pixels and may generate binning values BV1 through BV4. The image sensor 100 may perform various processing (e.g., correlated double sampling) on the binning values BV1 and BV2 and may output video data B1 and B2 for the third pixel group PG3. As in the above description, the image sensor 100 may process the binning values BV3 and BV4 and may output video data G1 and G2 for the fourth pixel group PG4.

The image sensor 100 may also perform analog binning on a unit pixel group including a phase detection pixel from among unit pixel groups of each pixel group. In this case, however, charges of a normal pixel may not be considered. That is, the image sensor 100 may perform analog binning for summing charges converted by photoelectric conversion elements of phase detection pixels of the third pixel group PG3. Afterwards, the image sensor 100 may perform various processing (e.g., correlated double sampling) on a result of the analog binning and may output the phase detection data L1 for the third pixel group PG3. As in the above description, the image sensor 100 may output the phase detection data R1 for the fourth pixel group PG4 based on charges of phase detection pixels of the fourth pixel group PG4. As a result, the image data IDAT including 6 pixel data may be obtained from physical pixels arranged in 3 rows and 6 columns.

However, the process of obtaining the image data IDAT including the 6 pixel data is not limited to analog binning. In other words, unlike the above description, physical pixels of the image sensor 100, which are arranged in 3 rows and 6 columns, may output pixel data, respectively, and the image data IDAT including 6 pixel data may be obtained by performing digital binning within the image sensor 100 or at a next stage (e.g., the ISP front end block 200 or the image signal processor 300) of the image sensor 100.

The ISP front end block 200 may receive the image data IDAT from the image sensor 100 and may split the image data IDAT into video data DAT1 and phase detection data DAT2. The ISP front end block 200 may transfer the video data DAT1 through the phase detection pixel correction block 310 and may transfer the phase detection data DAT2 to the phase detection processing block 330.

The phase detection pixel correction block 310 may perform phase detection pixel correction on video data of the pixel groups PG3 and PG4 including a phase detection pixel, based on the video data DAT1 received from the ISP front end block 200 and a weight control signal CTRL_WV received from the outside (e.g., a host device such as an application processor).

The phase detection pixel correction block 310 may obtain a value of video data for the third pixel group PG3 by summing video data B1 through which a weight $\alpha$ is applied and video data B2 to which a weight $\beta$ is applied. For example, in the case of intending to reinforce the degree to which the artifact is reduced, values of the weights $\alpha$ and $\beta$ may be the same or may be mostly the same. For example, in the case of intending to reinforce the performance of phase detection auto-focus (PDAF), a value of the weight $\alpha$ may be smaller than a value of the weight $\beta$. For example, values of the weights $\alpha$ and $\beta$ may be adjusted by a host device (e.g., an application processor) according to an ambient environment or may be selected according to a user mode. A sum of the weights $\alpha$ and $\beta$ may be "1." As in the above description, the phase detection pixel correction block 310 may obtain a value of video data for the fourth pixel group PG4 by summing video data G1 to which the weight $\alpha$ is applied and video data G2 to which the weight $\beta$ is applied.

The phase detection pixel correction block 310 may transfer PDAF-corrected video data ($\alpha$B1+$\beta$B2) and ($\alpha$G1+$\beta$G2) to the video output buffer 320. The video output buffer 320 may buffer the PDAF-corrected video data ($\alpha$B1+$\beta$B2) and ($\alpha$G1+$\beta$G2) and may transfer the PDAF-corrected video data ($\alpha$B1+$\beta$B2) and ($\alpha$G1+$\beta$G2) to the arbiter 350.

The phase detection processing block 330 may collect and align pieces of phase detection data at the same row and may transfer the aligned phase detection data to the phase detection output buffer 340. The phase detection output buffer 340 may buffer the aligned phase detection data and may transfer the aligned phase detection data to the arbiter 350.

The arbiter 350 may receive the PDAF-corrected video data ($\alpha$B1+$\beta$B2) and ($\alpha$G1+$\beta$G2) from the video output buffer 320 and may receive the aligned phase detection data from the phase detection output buffer 340. The arbiter 350 may add the corresponding phase detection data to the video data and may transfer the video data and the phase detection data to the host device (e.g., an application processor) in an interlace or interleave manner.

Figure 10:
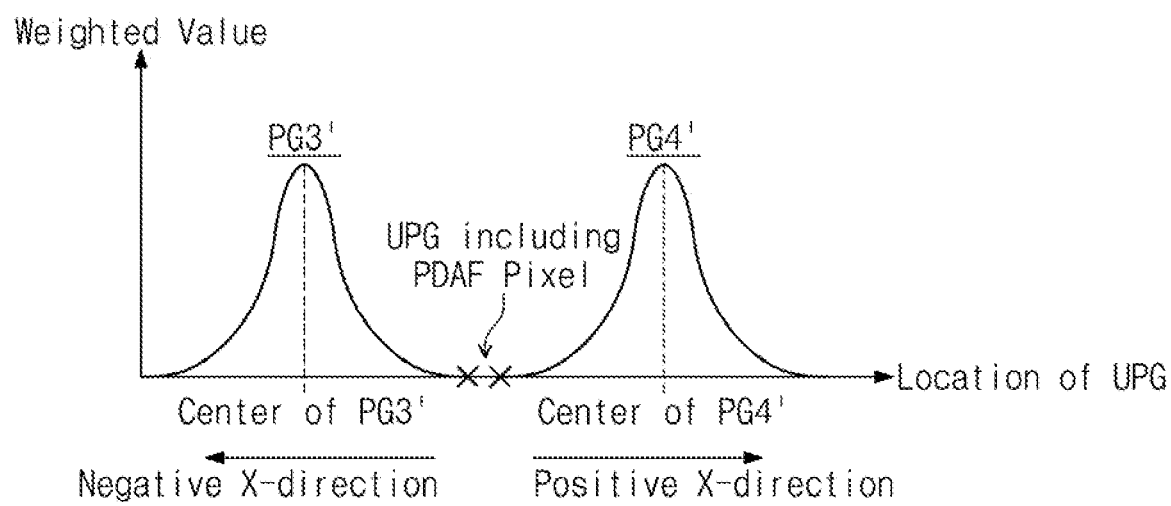
FIGS. 10 and 11 are graphs illustrating a relationship between a location of a unit pixel group in a pixel group and a weight applied to video data of the unit pixel group.
Figure 11:
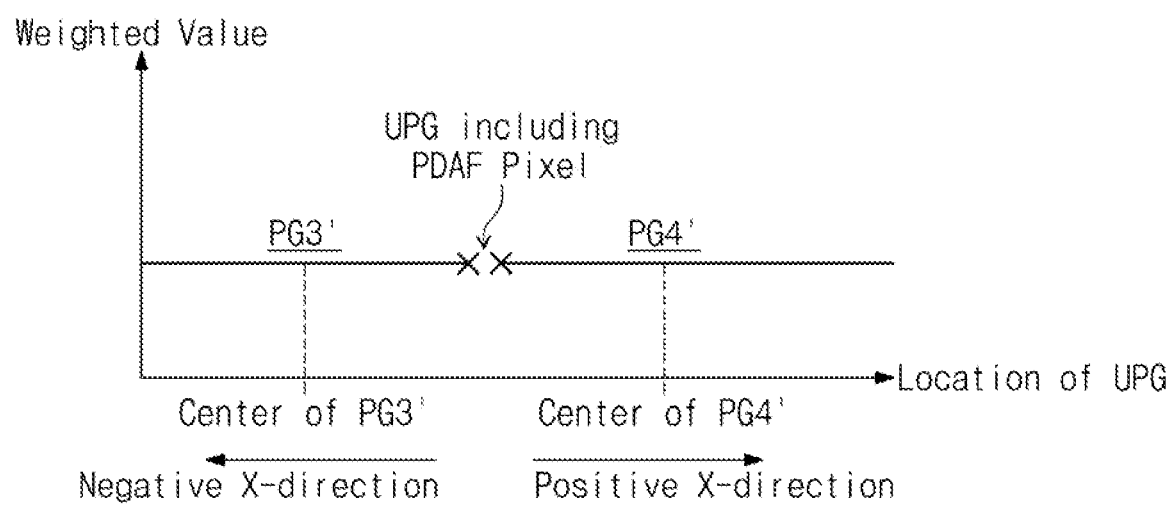

FIGS. 10 and 11 are graphs illustrating a relationship between a location of a unit pixel group in a pixel group and a weight applied to video data of the unit pixel group. In the above embodiments, the description is given as one pixel group includes three unit pixel groups. However, in FIG. 10, it is assumed that each of pixel groups PG3' and PG4' includes "n" unit pixel groups. As in the arrangement of the pixel groups PG3 and PG4 illustrated in FIG. 3, it is assumed that a unit pixel group including a phase detection pixel from among unit pixel groups of the third pixel group PG3' and a unit pixel group including a phase detection pixel from among unit pixel groups of the fourth pixel group PG4' are adjacent to each other.

First, the graph of FIG. 10 may be associated with weights that are applied in the case of intending to reinforce the performance of phase detection of an image sensor. For example, a weight that is applied to video data of a unit pixel group disposed on the center of a pixel group may be the greatest. As a distance from the center increases, a weight that is applied to video data of the unit pixel group may decrease. In embodiments, the graph of FIG. 10 is depicted in the shape of a Gaussian distribution, but a shape of the graph is not limited thereto. For example, weights of FIG. 10 may decrease linearly as a distance from the center of the unit pixel group PG3' or PG4' increases.

In embodiments, the graph of weights associated with the third pixel group PG3' and the graph of weights associated with the fourth pixel group PG4' may be the same. This may be understood as the context similar to what the weights $\alpha$ and $\beta$ applied to the video data B1 and B2 are the same as the weights $\alpha$ and $\beta$ applied to the video data G1 and G2, in the embodiments of FIG. 9. In FIG. 10, a portion marked by "X" is associated with a unit pixel group including a phase detection pixel and symbolically indicates that a weight is not applied to pixel data (i.e., not video data but phase detection data) of the unit pixel group including the phase detection pixel.

Next, the graph of FIG. 11 may be associated with weights that are applied in the case of intending to improve the artifact of an image sensor. For example, the same weight may be applied to all unit pixel groups belonging to a pixel group. Likewise, in FIG. 11, a portion marked by "X" is associated with a unit pixel group including a phase detection pixel and indicates that a weight is not applied to phase detection data of the unit pixel group including the phase detection pixel.

In embodiments, weights illustrated in FIGS. 10 and 11 may be adjusted by a host device (e.g., an application processor) according to an ambient environment such as illuminance. Alternatively, the weights illustrated in FIGS. 10 and 11 may be selected by the user according to various modes. For example, in the case of intending to obtain a clean image, a phase detection auto-focus function may become more important; in this case, an operation mode in which the weights illustrated in FIG. 10 are applied to video data may be selected by the user. For example, in the case of intending to obtain an excellent color, an artifact improvement function may become more important; in this case, an operation mode in which the weights illustrated in FIG. 11 are applied to video data may be selected by the user.

Figure 12:
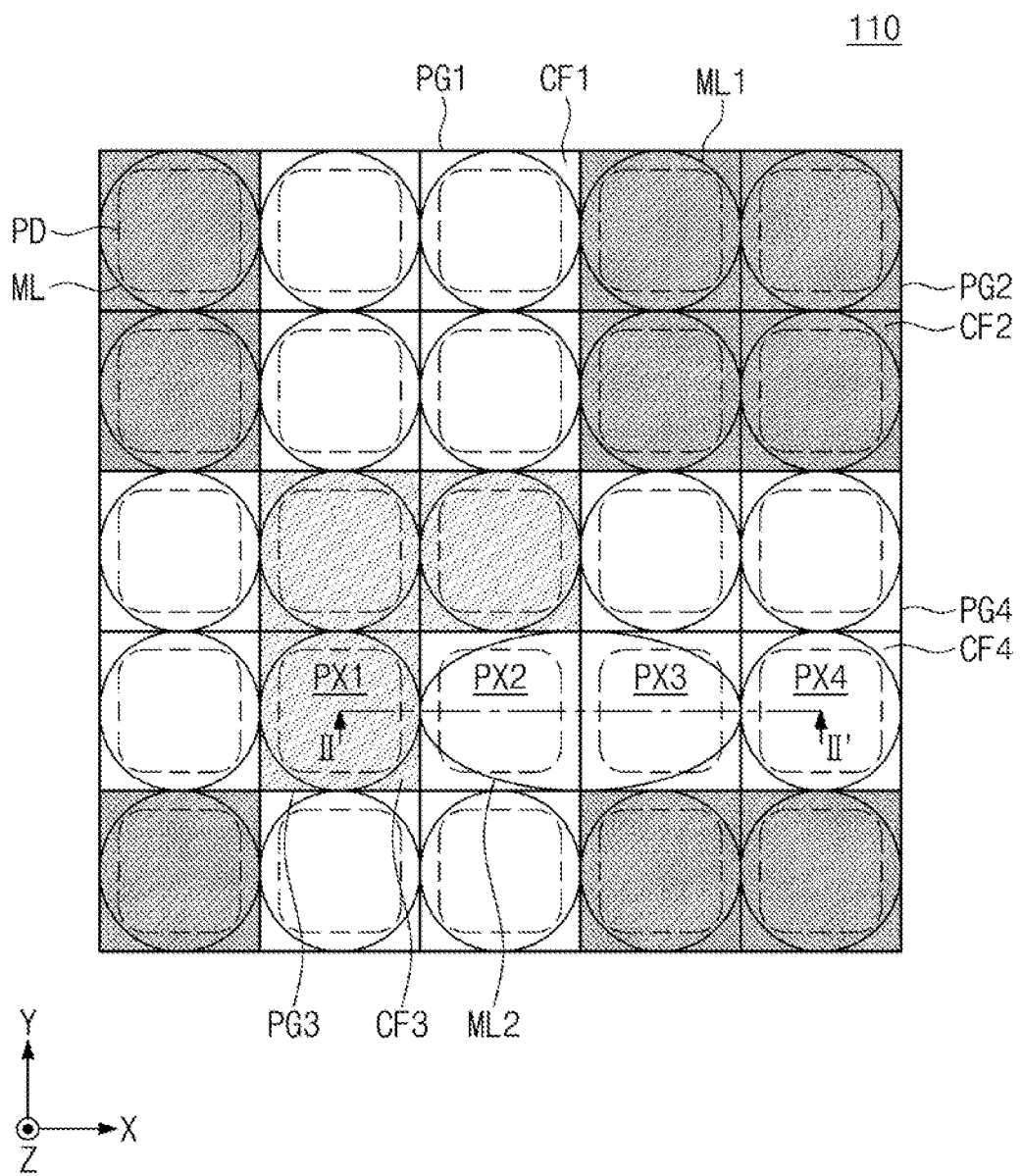
FIG. 12 is a plan view of the pixel array of FIG. 2, according to embodiments.

FIG. 12 illustrates a plan view of the pixel array 110 of FIG. 2, according to embodiments. The pixel array 110 may include the pixel groups PG1 through PG4. Each of the pixel groups PG1 through PG4 may include 3×3 pixels arranged along the X-axis and the Y-axis. Each pixel may include the photoelectric conversion element PD. Photoelectric conversion elements of pixels belonging to one pixel group may share one floating diffusion region. The pixel groups PG1 through PG4 may be repeatedly formed on a substrate of an image sensor along the X-axis and the Y-axis, and thus, the pixel array 110 may have a Tetra-Bayer pattern.

The color filters CF1 through CF4, each of which passes a light of a wavelength band, may be respectively formed on the pixel groups PG1 through PG4. For example, the first color filter CF1 and the fourth color filter CF4 may pass a green light, the second color filter CF2 may pass a red light, and the third color filter CF3 may pass a blue light.

A micro lens ML may be formed on a color filter formed on each pixel. In embodiments, the first micro lenses ML1 may be formed above normal pixels (e.g., PX1 and PX4), and the second micro lens ML2 may be formed above a pair of phase detection pixels (e.g., PX2 and PX3). For example, the second micro lens ML2 may be formed above a pixel (e.g., PX2) of the third pixel group PG3 associated with the blue light and above a pixel (e.g., PX3) of the fourth pixel group PG4 associated with the green light.

A cross-sectional view of the pixel array 110 taken along line II-IF is mostly similar to the cross-sectional view illustrated in FIG. 4, and thus, additional description will be omitted to avoid redundancy.

Figure 13:
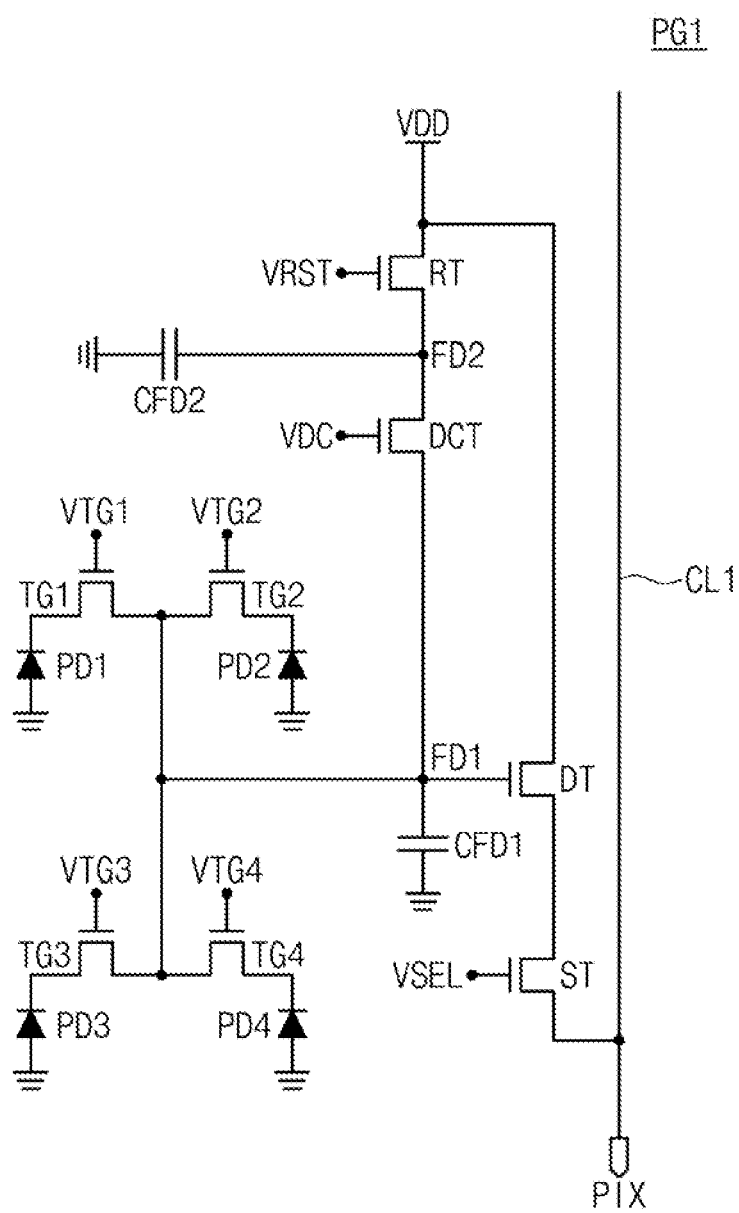
FIG. 13 illustrates a circuit diagram of one of the pixel groups of FIG. 12.

FIG. 13 illustrates a circuit diagram of one of the pixel groups PG1 through PG4 of FIG. 12. In embodiments, the first pixel group PG1 may include photoelectric conversion elements PD1 through PD4, transfer transistors TG1 through TG4, a dual conversion transistor DCT, a reset transistor RT, a drive transistor DT, and a select transistor ST. A first pixel Gr1 may include the first photoelectric conversion element PD1 and the first transfer transistor TG1. A second pixel Gr2 may include the second photoelectric conversion element PD2 and the transfer transistor TG2, and each of the remaining pixels Gr3 and Gr4 may include components/elements similar to those of the first/second pixel Gr1/Gr2. The first through fourth pixels Gr1 through Gr4 may share the dual conversion transistor DCT, the reset transistor RT, the drive transistor DT, the select transistor ST, and a floating diffusion region FD1.

The extension of the capacitance of the floating diffusion region FD1 by the dual conversion transistor DCT and operations of the transfer transistors TG1 through TG4, the reset transistor RT, the drive transistor DT, and the select transistor ST are mostly similar to those described with reference to FIG. 5, and thus, additional description will be omitted to avoid redundancy.

Figure 14:
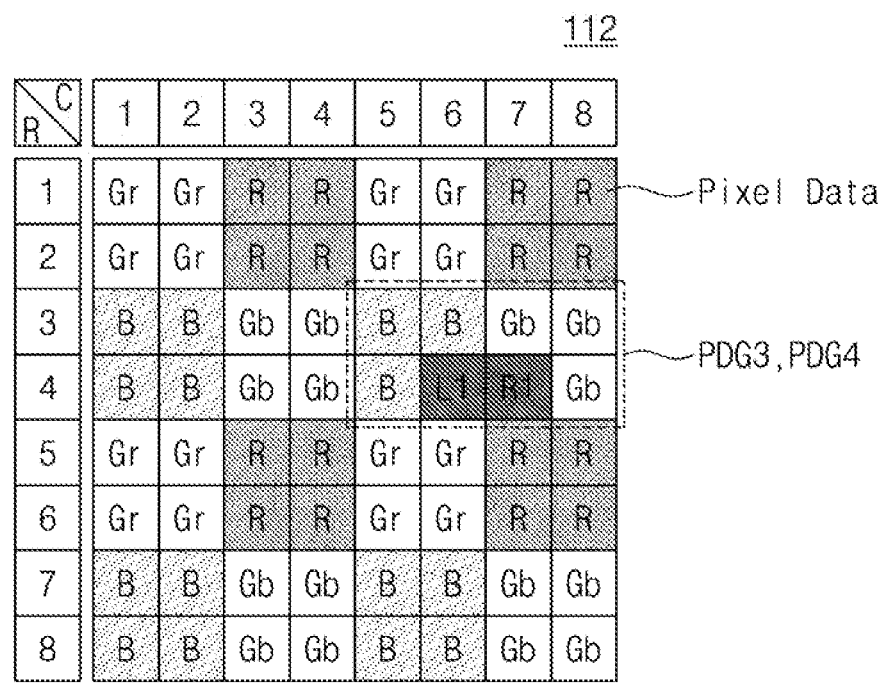

FIG. 14 illustrates a pixel map 112 based on image data output from the image sensor 100 (refer to FIG. 2) including the pixel array 110 of FIG. 13. The pixel map 112 illustrated in FIG. 14 may be a pixel map output from the image processing device operating in the normal mode. The image data IDAT output from the image sensor 100 may constitute a pixel map of one frame. The pixel map 112 may include 64 pixel data disposed in 8 rows and 8 columns, and each pixel data that are output of the image sensor 100 may have a digital value.

Pixel data (i.e., video data) that are based on a pixel signal output from a normal pixel may have one of values "R," Gr, Gb, and "B" associated with colors of an object. Pixel data (i.e., phase detection data) that are based on a pixel signal output from a phase detection pixel may have one of values L1 and R1 associated with phases of the object. The image signal processor may perform re-mosaic for generating an image of a Bayer pattern by using the video data "R," Gr, Gb, and "B" of the pixel map 112 and may perform phase detection auto-focus (PDAF) by using the phase detection data L1 and R1.

Figure 15:
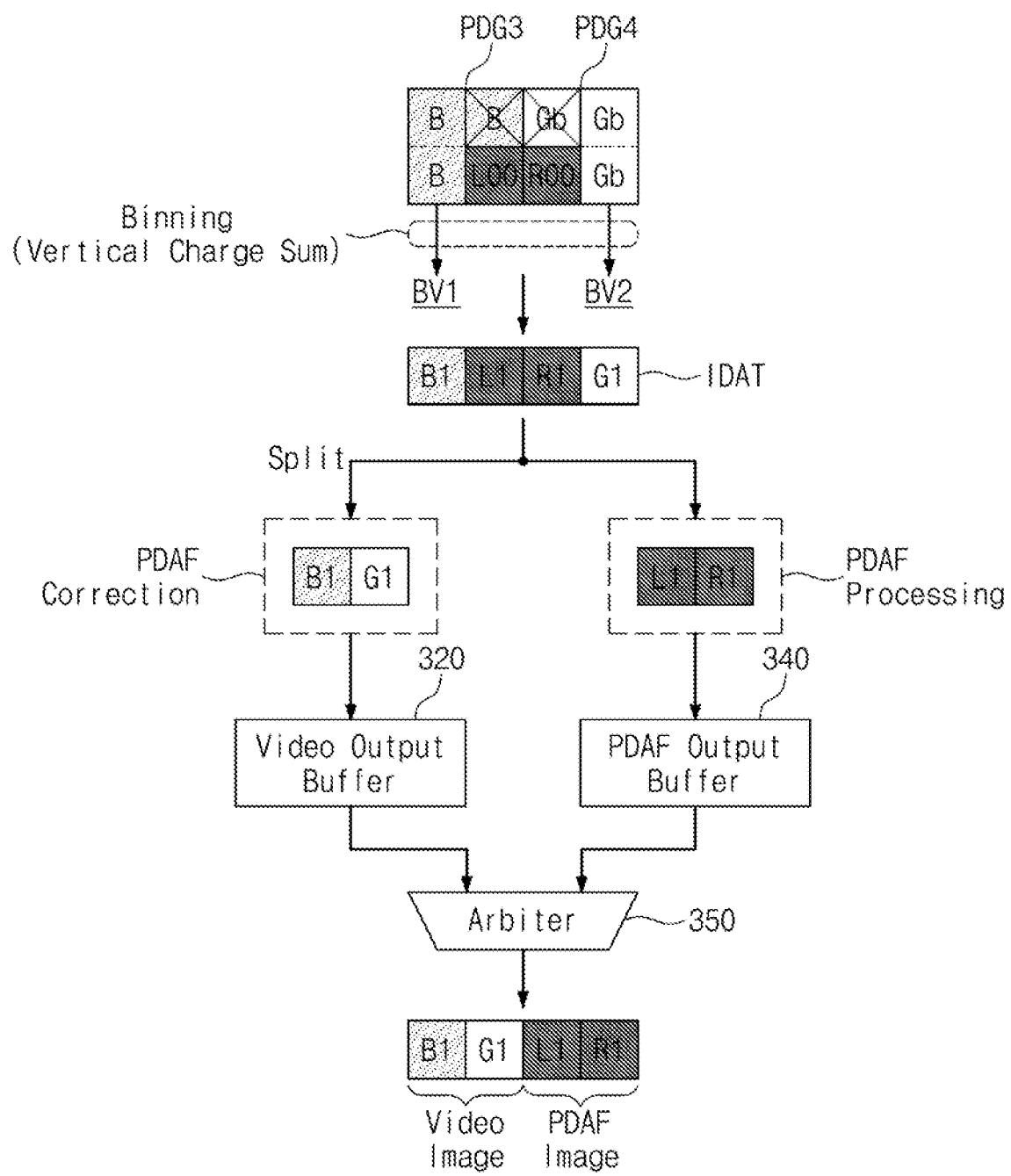
FIG. 15 illustrates phase detection pixel correction performed on an output of the image sensor including the pixel array of FIGS. 12 to 13.

FIG. 15 illustrates phase detection pixel correction performed on an output of the image sensor 110 including the pixel array 110 of FIGS. 12 to 13.

First, how the image processing device operates in the binning mode will be described with reference to FIGS. 1, 2, 8, 12, and 13. The pixel data groups PDG3 and PDG4 illustrated in FIG. 15 may correspond to the pixel groups PG3 and PG4 of FIG. 12. The image sensor 100 may generate the binning values BV1 and BV2 by performing analog binning for summing charges converted by photoelectric conversion elements of a column including only normal pixels of pixels included in the pixel groups PG3 and PG4. The image sensor 100 may perform various processings (e.g., correlated double sampling) on the binning values BV1 and BV2 and may output video data B1 for the third pixel group PG3 and the video data G1 for the fourth pixel group PG4.

However, the image sensor 100 may not perform analog binning on pixels, which belong to a column including a phase detection pixel, from among the pixels included in the pixel groups PG3 and PG4 (refer to FIG. 12). Under control of the image sensor 100, charges of normal pixels, which belong to a column including a phase detection pixel, from among pixels of a pixel group may not be applied to the binning operation. In embodiments, pixel data that are not associated with the analog binning are marked by "X."

The image sensor 100 may perform various processing (e.g., correlated double sampling) on pixel signals output from phase detection pixels and may output the phase detection data L1 for the third pixel group PG3 and the phase detection data R1 for the fourth pixel group PG4. As a result, the image data IDAT including 4 pixel data may be obtained from physical pixels arranged in 2 rows and 4 columns.

The ISP front end block 200 may receive the image data IDAT from the image sensor 100 and may split the image data IDAT into the video data DAT1 and the phase detection data DAT2. The ISP front end block 200 may transfer the video data DAT1 to the phase detection pixel correction block 310 and may transfer the phase detection data DAT2 to the phase detection processing block 330.

The phase detection pixel correction block 310 may select the video data B1 as video data for the third pixel group PG3 and may select the video data G1 as video data for the fourth pixel group PG4. In the binning mode, in the case of generating video data of a pixel group including a phase detection pixel, pixel signals output from normal pixels of the pixel group including the phase detection pixel are not considered. However, according to embodiments, the video data B1 and G1 of the pixel group including the phase detection pixel are generated based on the binning values BV1 and BV2 output from the normal pixels, and thus, the artifact may be improved.

The phase detection pixel correction block 310 may transfer the video data B1 and G1 to the video output buffer 320, and the video output buffer 320 may buffer the video data B1 and G1 and may transfer the video data B1 and G1 to the arbiter 350. The phase detection processing block 330 may collect and align pieces of phase detection data at the same row and may transfer the aligned phase detection data to the phase detection output buffer 340. The phase detection output buffer 340 may buffer the aligned phase detection data and may transfer the aligned phase detection data to the arbiter 350.

Figure 16:
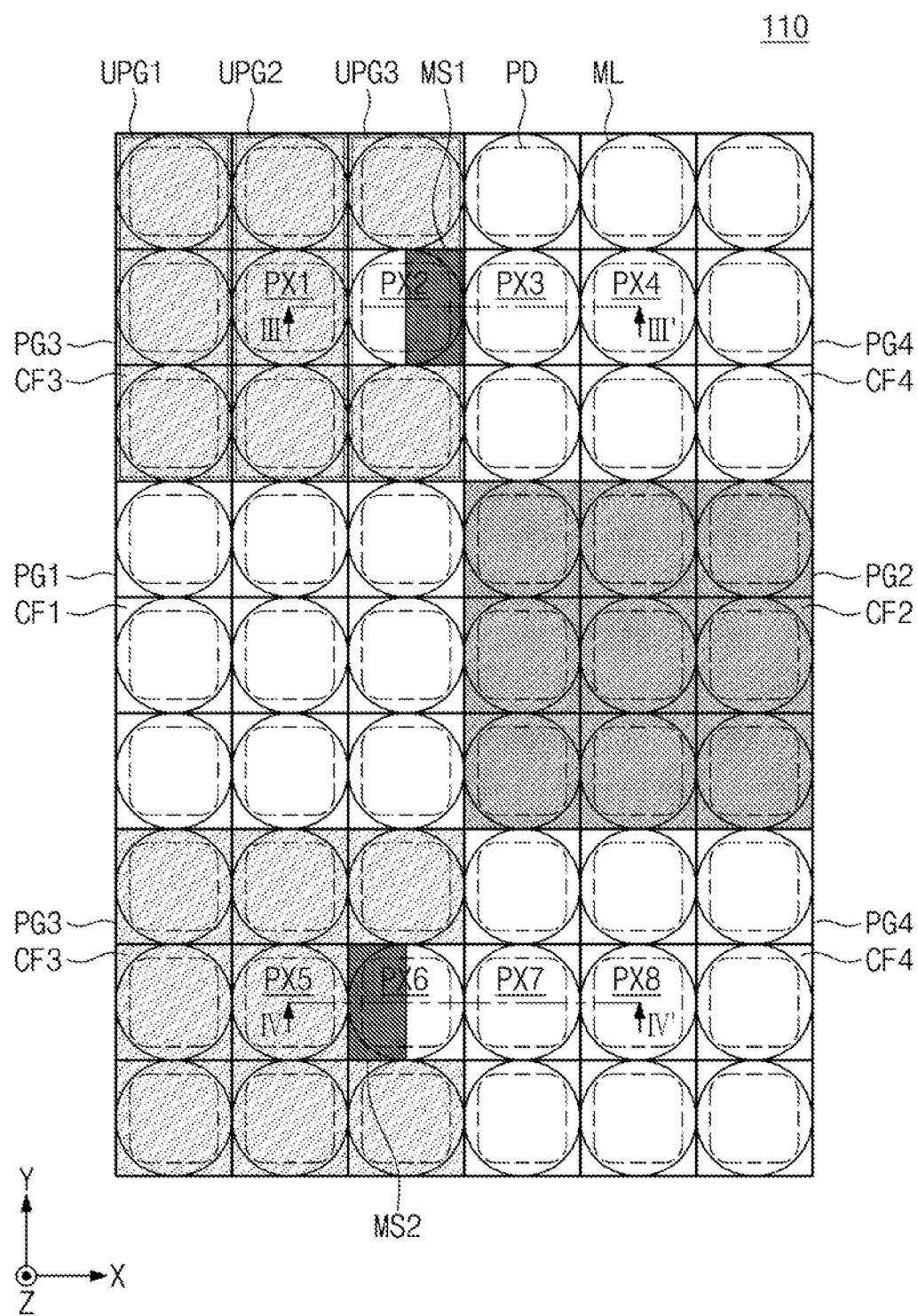
FIG. 16 illustrates a plan view of the pixel array of FIG. 2, according to embodiments.

FIG. 16 illustrates a plan view of the pixel array 110 of FIG. 2, according to embodiments. The pixel array 110 may include the pixel groups PG1 through PG4. The pixel groups PG1 through PG4 may be repeatedly formed on a substrate of an image sensor along the X-axis and the Y-axis. Each of the pixel groups PG1 through PG4 may include 3×3 pixels arranged along the X-axis and the Y-axis. Each pixel may include the photoelectric conversion element PD.

The arrangement of the unit pixel groups UPG1 through UPG3 will be described by using the third pixel group PG3 as an example. Each of the unit pixel groups UPG1 through UPG3 may include 3×1 pixels arranged along the X-axis and the Y-axis. A unit pixel group may include pixels sharing the same floating diffusion region. That is, a structure of pixels of the pixel array 110 illustrated in FIG. 16 may be mostly the same as that illustrated in FIG. 5.

The color filters CF1 through CF4 for passing a light of a wavelength band may be respectively formed on the pixel groups PG1 through PG4. For example, the first color filter CF1 passing a green light, the second color filter CF2 passing a red light, the third color filter CF3 passing a blue light, and the fourth color filter CF4 passing a green light may be formed above the pixel groups PG1 through PG4, respectively. However, the fourth color filter CF4 may not be formed above phase detection pixels PX2 and PX6 of the third pixel groups PG3.

The micro lens ML may be formed on a color filter formed on each pixel. For example, unlike the above embodiments, one micro lens ML may be formed above one pixel, and the micro lens ML formed above each pixel may have the same shape (i.e., not an oval but a circle).

Pixels belonging to one pixel group may have the same structure. However, some of the third pixel groups PG3 may include the phase detection pixels PX2 and PX6, and the phase detection pixels PX2 and PX6 may be different in structure from the remaining pixels (i.e., normal pixels) belonging to the third pixel groups PG3. For example, the second pixel PX2 of the third pixel group PG3 may include a first metal shield MS1 blocking a portion of a light incident onto a pixel. The sixth PX6 of the third pixel group PG3 may include a second metal shield MS2 blocking a portion of a light incident onto a pixel. As a result, phase information about an object may be obtained based on pixel signals output from the phase detection pixels PX2 and PX6, and the phase detection auto-focus (PDAF) may be performed.

Unlike the embodiments illustrated in FIG. 16, the third unit pixel group UPG3 of the third pixel group PG3 may include two phase detection pixels. In this case, a phase detection pixel, not a normal pixel, may be provided at a location adjacent to the phase detection pixel PX2 in a column direction (i.e., a positive Y-axis direction or a negative Y-axis direction), and the phase detection pixel thus provided may include a metal shield, of which a type is the same as that of the metal shield MS1 of the phase detection pixel PX2. Also, a phase detection pixel, not a normal pixel, may be provided at a location adjacent to the phase detection pixel PX6 in the column direction (i.e., the positive Y-axis direction or the negative Y-axis direction), and the phase detection pixel thus provided may include a metal shield, of which a type is the same as that of the metal shield MS2 of the phase detection pixel PX6.

Figure 17:
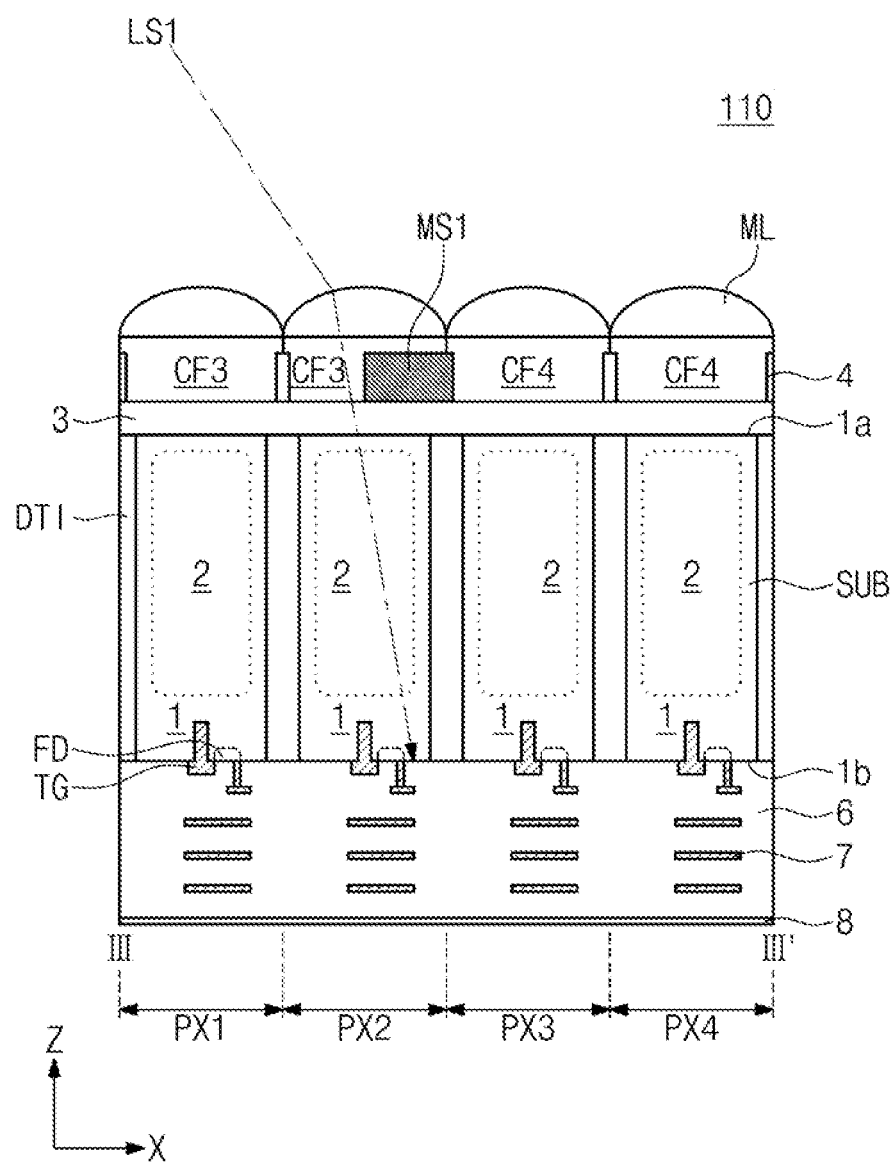
FIG. 17 is a cross-sectional view of the pixel array taken along line III-III' of FIG. 16.
Figure 18:
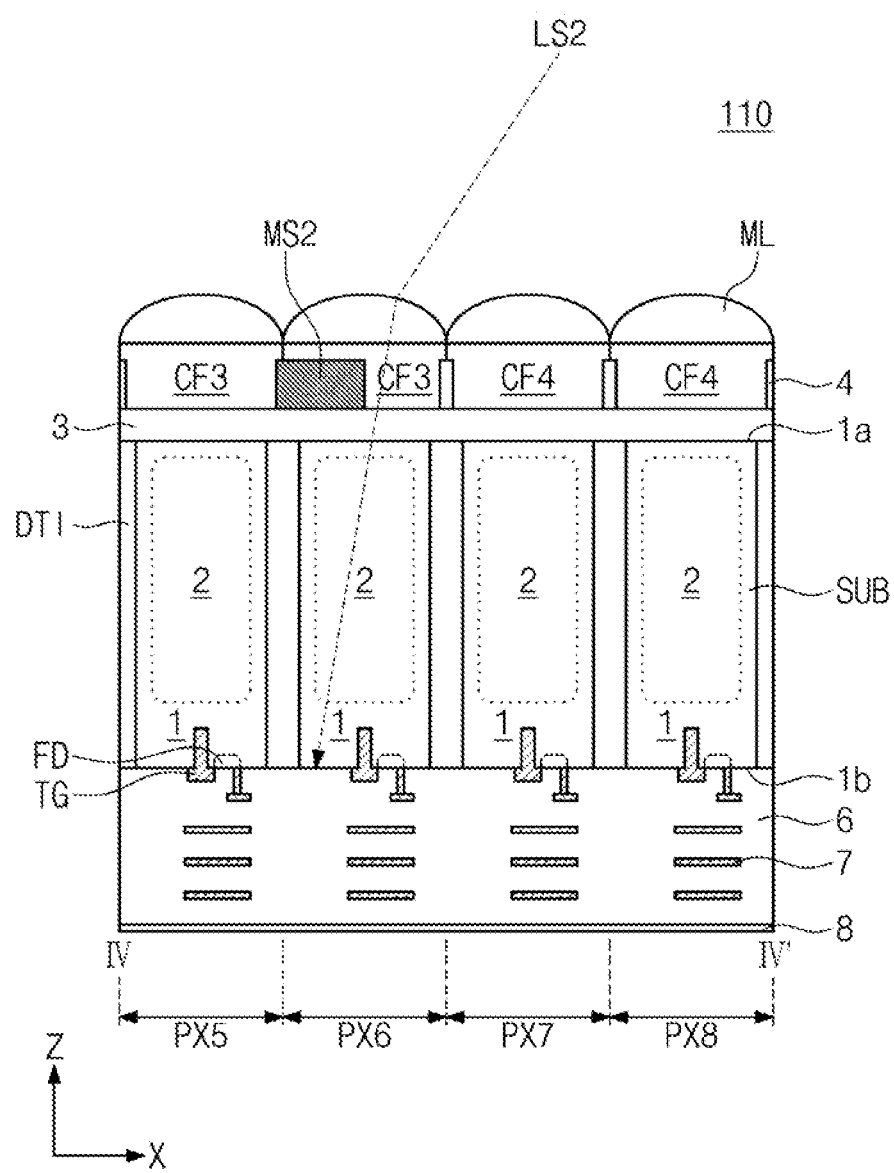
FIG. 18 illustrates a cross-sectional view of the pixel array taken along line IV-IV' of FIG. 16.

FIG. 17 illustrates a cross-sectional view of the pixel array 110 taken along line III-III' of FIG. 16, and FIG. 18 illustrates a cross-sectional view of the pixel array 110 taken along line IV-IV' of FIG. 16. The cross-sectional views illustrated in FIGS. 17 and 18 are mostly similar to the cross-sectional view to FIG. 4. Therefore, differences associated with the micro lens ML and the metal shields MS1 and MS2 will be mainly described.

First, referring to FIG. 17, the light LS1 incident onto the second pixel PX2 may be restricted by the first metal shield MS1. Here, because the light LS1 is described with reference to FIG. 4, the light LS1 may be understood as a light refracted by the lens 12 (refer to FIG. 1). Next, referring to FIG. 18, the light LS2 incident onto the sixth pixel PX6 may be restricted by the second metal shield MS2. A pixel signal output from the first pixel PX1 and a pixel signal output from the sixth pixel PX6 may be paired and may include information about a phase of an object. The pixel signal output from the first pixel PX1 and the pixel signal output from the sixth pixel PX6 may be used to perform the phase detection auto-focus (PDAF).

In embodiments, the metal shields MS1 and MS2 may include a metal material that is appropriate to partially block the incident lights LS1 and LS2. Alternatively, the metal shields MS1 and MS2 may include, but are not limited to, a material (e.g., tungsten or titanium) the same as that of the separations 4.

Figure 19:
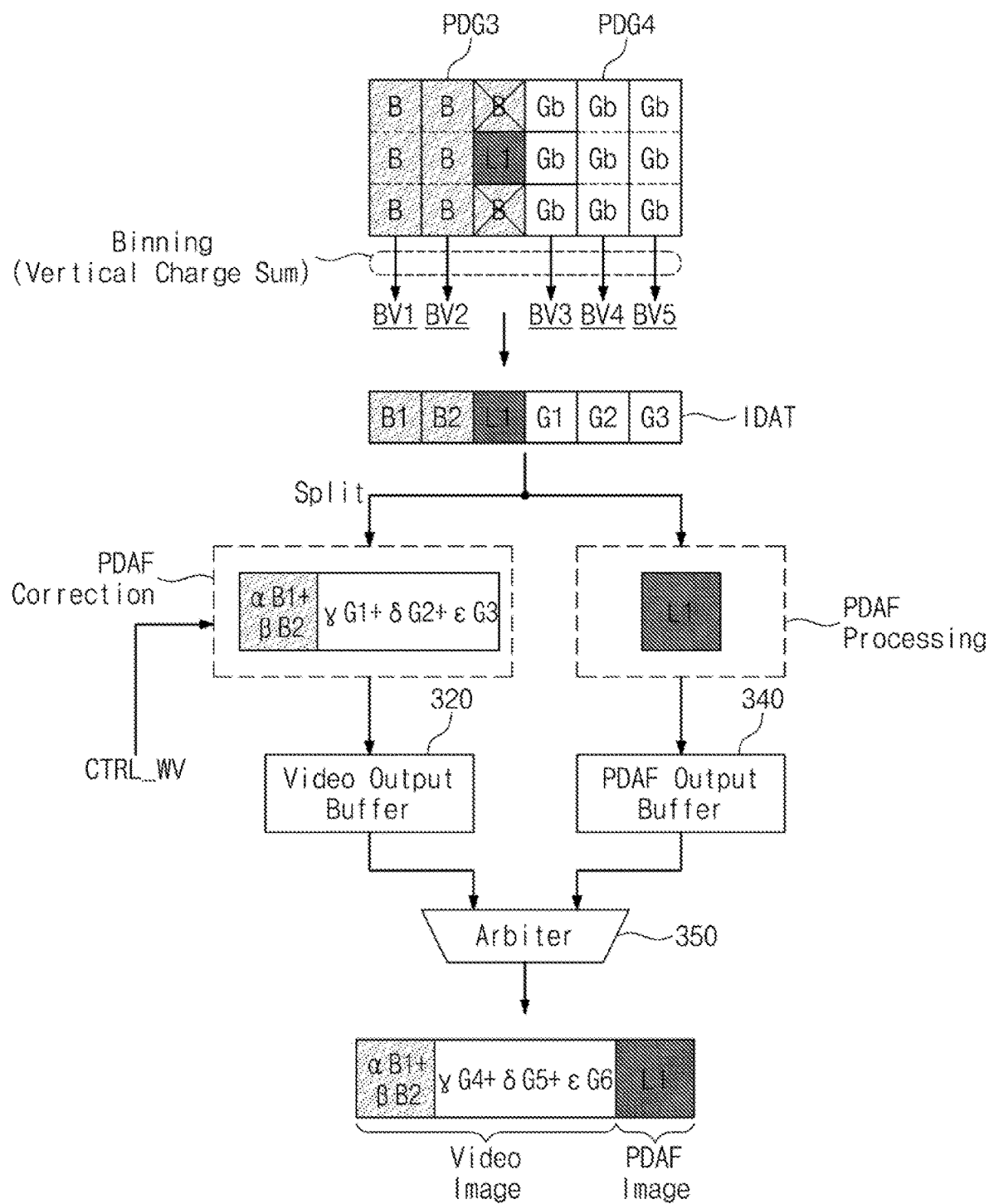
FIG. 19 illustrates phase detection pixel correction performed on an output of the image sensor including the pixel array of FIG. 16.

FIG. 19 illustrates phase detection pixel correction performed on an output of the image sensor 100 including the pixel array 110 of FIG. 16. How the image processing device operates in the binning mode will be described with reference to FIGS. 1, 2, 8, 16, and 19.

The pixel data groups PDG3 and PDG4 illustrated in FIG. 19 may correspond to the pixel groups PG3 and PG4 of FIG. 16. The image sensor 100 may perform analog binning for summing charges converted by photoelectric conversion elements of a unit pixel group composed of only normal pixels and may generate binning values BV1 through BV5. The image sensor 100 may perform various processing (e.g., correlated double sampling) on the binning values BV1 and BV2 and may output video data B1 and B2 for the third pixel group PG3. As in the above description, the image sensor 100 may process the binning values BV3, BV4, and BV5 and may output video data G1, G2, and G3 for the fourth pixel group PG4.

The image sensor 100 may also perform analog binning on a unit pixel group including a phase detection pixel from among unit pixel groups of each pixel group. Here, charges of a normal pixel may not be considered, and charges of a phase detection pixel may be only considered. However, in the embodiments of FIG. 19, because the third unit pixel group UPG3 includes one phase detection pixel (e.g., PX2), analog binning for summing charges may not be performed, and the phase detection data L1 may be generated based on a pixel signal output from the phase detection pixel PX2 of the third unit pixel group UPG3. Of course, in the case in which one unit pixel group includes a plurality of phase detection pixels, analog binning may be performed on the phase detection pixels. The image sensor 100 may output the image data IDAT including 6 pixel data by using physical pixels arranged in 3 rows and 6 columns.

The ISP front end block 200 may split the image data IDAT received from the image sensor 100 into the video data DAT1 and the phase detection data DAT2, may transfer the video data DAT1 to the phase detection pixel correction block 310, and may transfer the phase detection data DAT2 to the phase detection processing block 330.

Operations of the phase detection pixel correction block 310, the video output buffer 320, the phase detection processing block 330, the phase detection output buffer 340, and the arbiter 350 are mostly similar to those described in the above embodiments. However, a manner in which the phase detection pixel correction block 310 processes video data split from the image data IDAT of FIG. 19 may be somewhat different from that described in the above embodiments.

In detail, the phase detection pixel correction block 310 may obtain a value of video data for the third pixel group PG3 by summing the video data B1 to which the weight α is applied and the video data B2 to which the weight β is applied. This is the same as that described in the above embodiments. Accordingly, in the case of intending to reinforce the degree to which the artifact is reduced, values of the weights α and β may be the same or may be mostly the same; in the case of intending to reinforce the performance of phase detection auto-focus (PDAF), the weights α and β may follow the tendency of the graph of FIG. 10.

However, the phase detection pixel correction block 310 may apply weights to the video data G1, G2, and G3 output from the fourth pixel group PG4 in various manners. For example, the phase detection pixel correction block 310 may perform binning on the video data G1, G2, and G3 in the same manner as binning performed on a pixel group not including a phase detection pixel. In this case, weights γ, δ, and ε may be the same, and binning that is performed on the video data G1, G2, and G3 to which the weights γ, δ, and ε are applied may be digital binning.

Alternatively, the phase detection pixel correction block 310 may perform binning on the video data G1, G2, and G3 in the same manner as binning performed on a pixel group including a phase detection pixel. In this case, the weights α and γ may be the same, the weights β and δ may be the same, and the weight ε may be "0." However, the binning that is performed on the pixel group not including the phase detection pixel is not limited thereto. For example, weights that are applied to the video data G1, G2, and G3 may roughly have the tendency of the graph illustrated in FIG. 10.

In the embodiments of FIG. 19, the description is given as one pixel group includes 9 pixels arranged in 3 rows and 3 columns. However, the embodiments of FIG. 19 may be applied to the case in which one pixel group includes 4 pixels arranged in 2 rows and 2 columns as illustrated in FIG. 12. Unlike the embodiments of FIG. 19, in the case in which one unit pixel group includes two phase detection pixels, analog binning may be performed on outputs from two phase detection pixels disposed at the same column.

Figure 20:
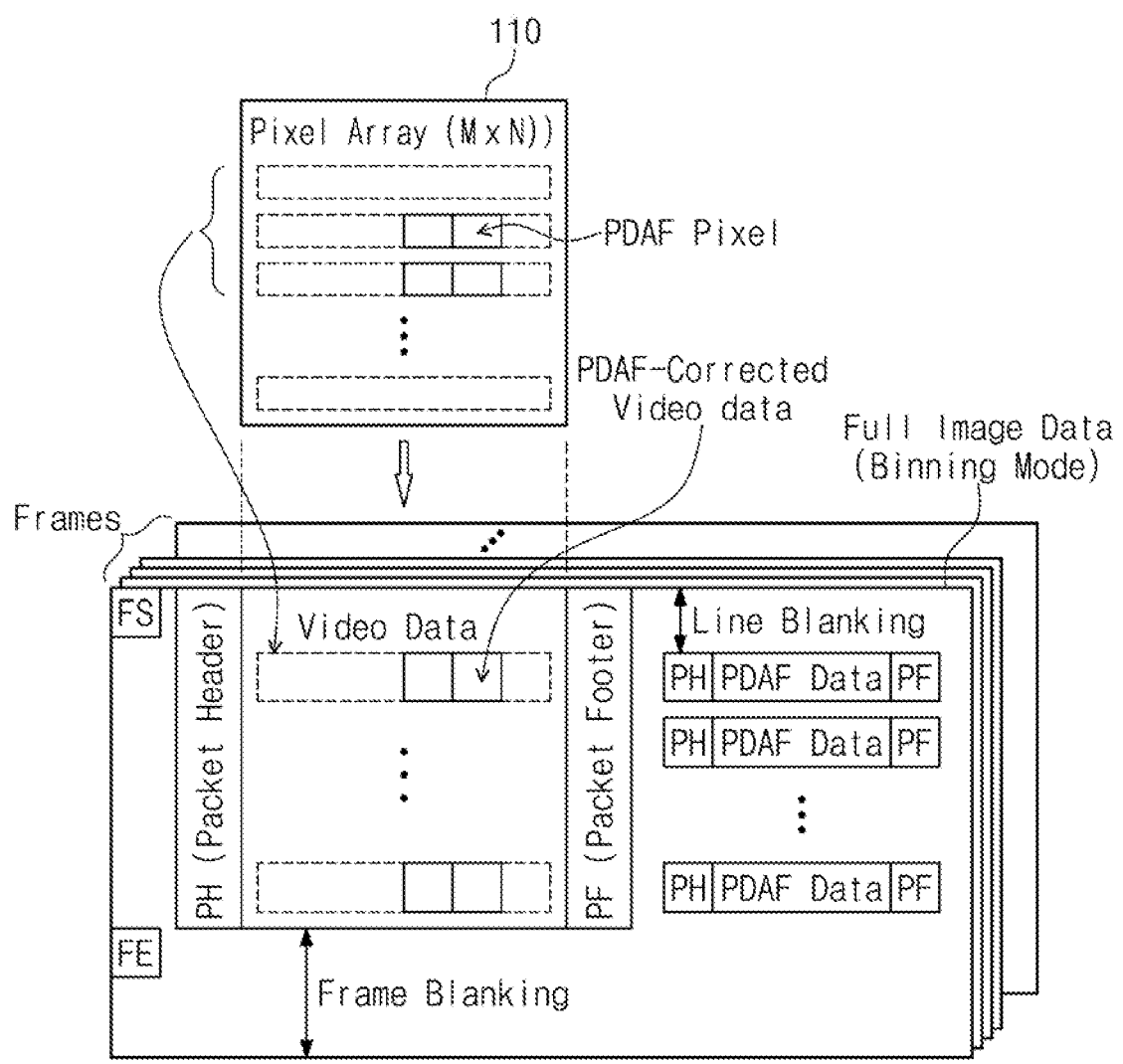
FIG. 20 illustrates a schematic format of full image data output from the image processing device of FIG. 1 in a binning mode, according to embodiments.

FIG. 20 illustrates a schematic format of full image data output from the image processing device 10 of FIG. 1 in a binning mode, according to embodiments.

In the binning mode of the image processing device, video data may be obtained by performing analog binning on each unit pixel group. Analog binning associated with a unit pixel group is schematically illustrated as three rows of the pixel array 110 correspond to one row of video data. The image signal processor may generate phase detection pixel-corrected (PDAF-corrected) video data and phase detection data based on image data received from the image sensor.

The image signal processor may add a packet header PH and a packet footer PF to each video data and may also add the packet header PH and the packet footer PF to each phase detection data. The image signal processor may add phase detection data to a tail of relevant video data and may transfer packetized video data and packetized phase detection data to a host (e.g., an application processor) in an interlace manner or an interleave manner.

Figure 21:
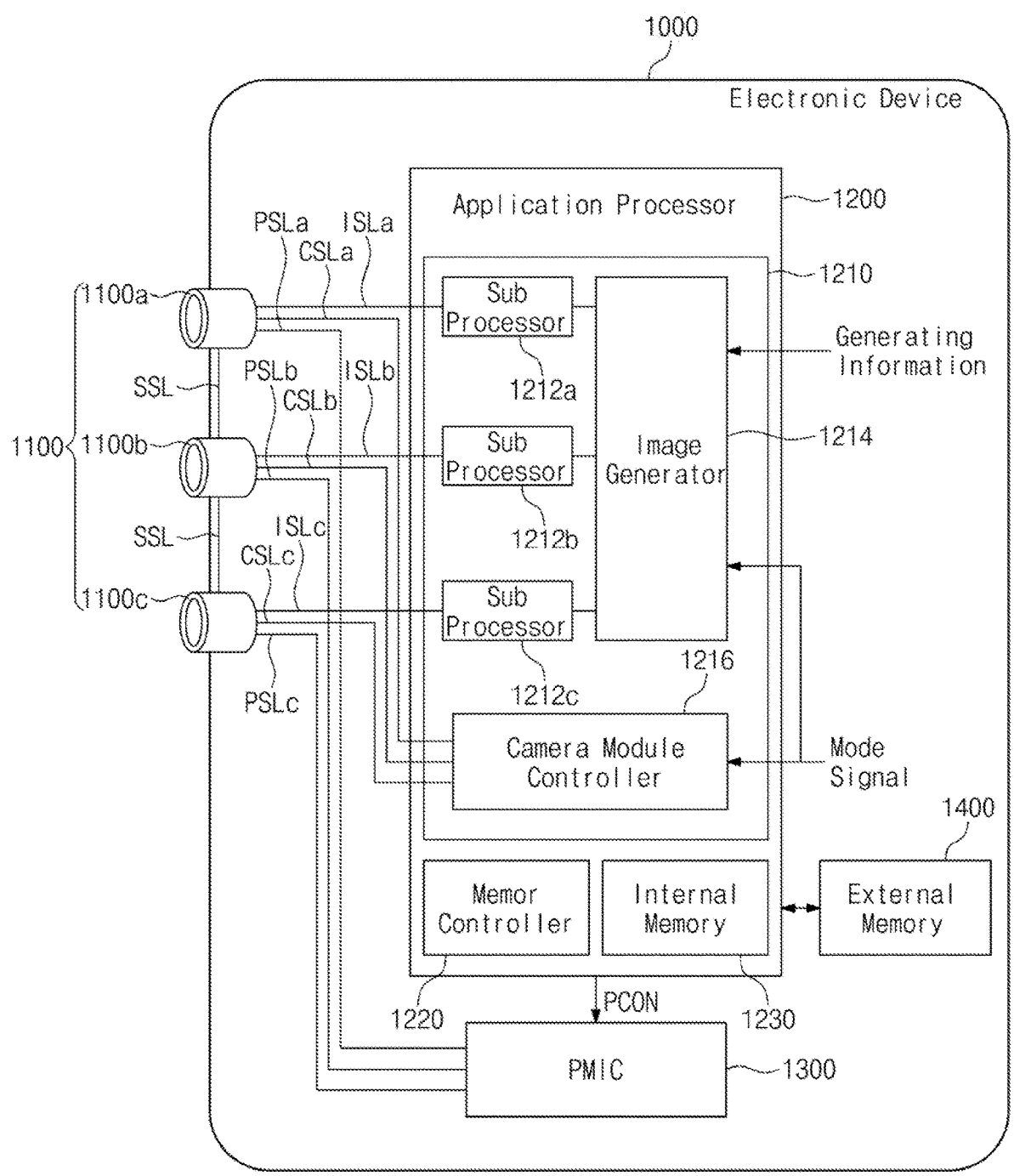
FIG. 21 illustrates a diagram of an electronic device including a camera module in which an image processing device according to embodiments is implemented.
Figure 22:
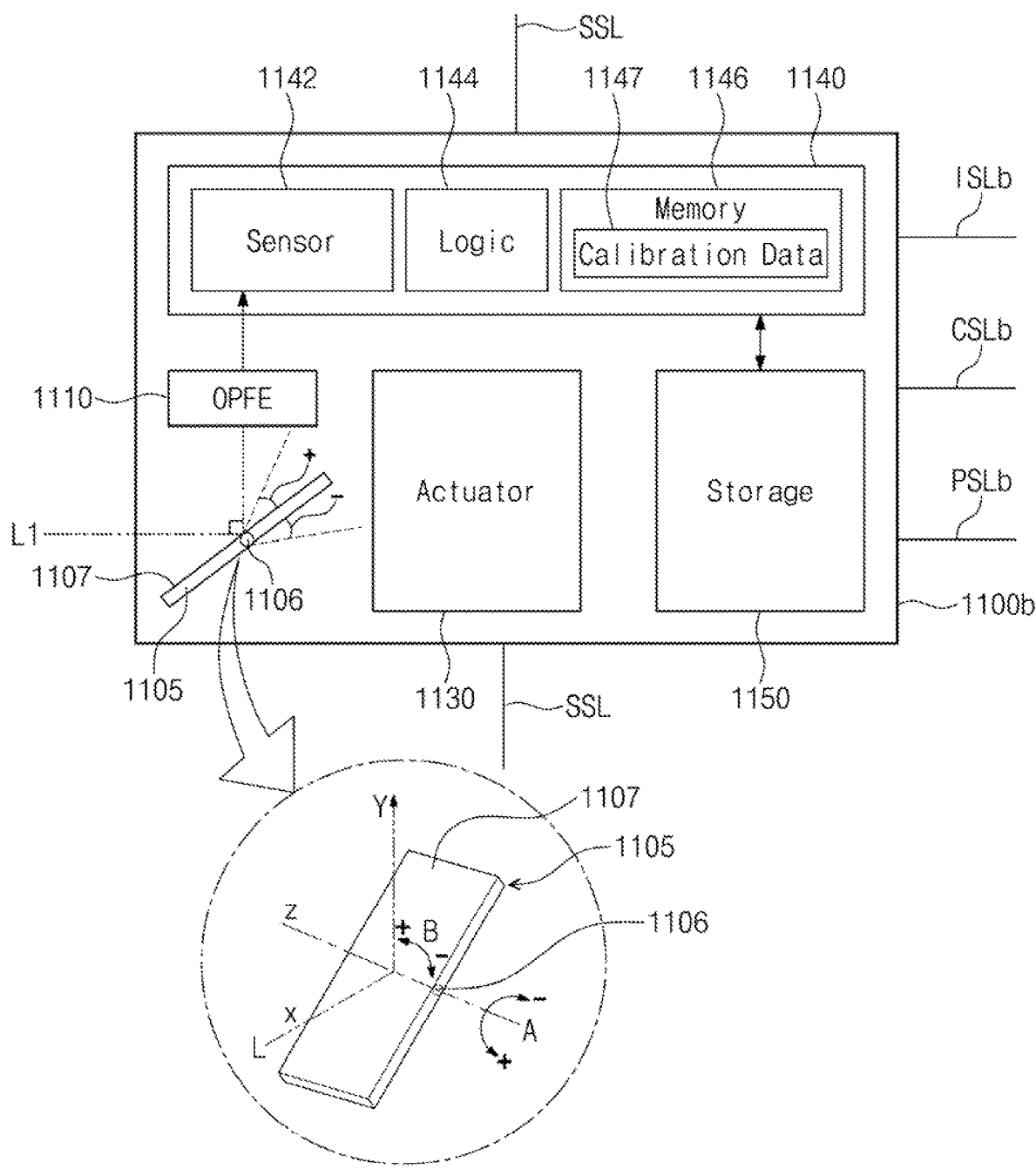
FIG. 22 illustrates a diagram of a camera module of FIG. 21.

FIG. 21 illustrates a diagram of an electronic device including a camera module in which an image processing device according to embodiments is implemented. FIG. 22 illustrates a diagram of a camera module of FIG. 21.

Referring to FIG. 21, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. An electronic device including three camera modules 1100a, 1100b, and 1100c is illustrated in FIG. 21, but embodiments are not limited thereto. In embodiments, the camera module group 1100 may be modified to include only two camera modules. Also, in embodiments, the camera module group 1100 may be modified to include "n" camera modules (n being a natural number of 4 or more).

Below, a detailed configuration of the camera module 1100b will be more fully described with reference to FIG. 22, but the following description may be equally applied to the remaining camera modules 1100a and 1100c.

Referring to FIG. 22, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In embodiments, the prism 1105 may change a path of the light "L" incident in a first direction "X" to a second direction "Y" perpendicular to the first direction "X." Also, the prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B." In this case, the OPFE 1110 may move in a third direction "Z" perpendicular to the first direction "X" and the second direction "Y."

In embodiments, as illustrated, a maximum rotation angle of the prism 1105 in direction "A" may be equal to or smaller than 15 degrees in a positive A direction and may be greater than 15 degrees in a negative A direction, but embodiments are not limited thereto.

In embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Z," the optical zoom ratio of the camera module 1100b may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100b and may include the ISP front end block 200 and the image signal processor 300 described above. For example, the control logic 1144 may control an operation of the camera module 1100b based on a control signal provided through a control signal line CSLb.

The memory 1146 may store information, which is for an operation of the camera module 1100b, such as calibration data 1147. The calibration data 1147 may include information for the camera module 1100b to generate image data by using the light "L" provided from the outside. The calibration data 1147 may include, for example, information about the degree of rotation described above, information about a focal length, information about an optical axis, etc. In the case in which the camera module 1100b is implemented in the form of a multi-state camera in which a focal length varies according to a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape in which the storage 1150 and a sensor chip constituting the image sensing device 1140 are stacked. In embodiments, the storage 1150 may be implemented with an electrically erasable programmable read only memory (EEPROM), but embodiments are not limited thereto.

Referring together to FIGS. 20 and 21, in embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c according to operations of the actuators 1130 therein.

In embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, embodiments are not limited thereto.

In embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, not limited to.

Also, in embodiments, fields of view of the plurality of camera modules 1100a, 1100b, and 1100c may be different. In this case, the plurality of camera modules 1100a, 1100b, and 1100c may include different optical lens, not limited thereto.

In embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 21, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216. The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but embodiments are not limited thereto.

In embodiments, one sub image processor may be disposed to correspond to a plurality of camera modules. For example, the sub image processor 1212a and the sub image processor 1212c may be integrally implemented, not separated from each other as illustrated in FIG. 12; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In detail, the image generator 1214 may generate the output image by merging at least a portion of the image data respectively generated from the camera modules 1100a, 1100b, and 1100c having different fields of view, depending on the image generating information Generating Information or the mode signal. Also, the image generator 1214 may generate the output image by selecting one of the image data respectively generated from the camera modules 1100a, 1100b, and 1100c having different fields of view, depending on the image generating information Generating Information or the mode signal.

In embodiments, the image generating information Generating Information may include a zoom signal or a zoom factor. Also, in embodiments, the mode signal may be, for example, a signal based on a mode selected from a user.

In the case in which the image generating information Generating Information is the zoom signal (or zoom factor) and the camera modules 1100a, 1100b, and 1100c have different visual fields of view, the image generator 1214 may perform different operations depending on a kind of the zoom signal. For example, in the case in which the zoom signal is a first signal, the image generator 1214 may merge the image data output from the camera module 1100a and the image data output from the camera module 1100c and may generate the output image by using the merged image signal and the image data output from the camera module 1100b that is not used in the merging operation.

In the case in which the zoom signal is a second signal different from the first signal, without the image data merging operation, the image generator 1214 may select one of the image data respectively output from the camera modules 1100a, 1100b, and 1100c and may output the selected image data as the output image. However, embodiments are not limited thereto, and a way to process image data may be modified without limitation.

In embodiments, the image generator 1214 may generate merged image data having an increased dynamic range by receiving a plurality of image data of different exposure times from any one or any combination of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed according to the zoom factor or an operating mode signal. For example, in the case in which the field of view of the camera module 1100a is wider than the field of view of the camera module 1100b and the zoom factor indicates a low zoom ratio, the camera module 1100b may operate as a master, and the camera module 1100a may operate as a slave. In contrast, in the case in which the zoom factor indicates a high zoom ratio, the camera module 1100a may operate as a master, and the camera module 1100b may operate as a slave.

In embodiments, the control signal provided from the camera module controller 1216 to each of the camera modules 1100a, 1100b, and 1100c may include a sync enable signal. For example, in the case in which the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

According to embodiments, a method of improving an artifact of a pixel group including a phase detection pixel of an image sensor operating in a binning mode is provided.

In detail, the artifact in a binning mode may be improved by adding various weights to pixel data that are based on an output from each unit pixel group of a pixel group.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An image processing device comprising:
an image sensor comprising a pixel array that comprises a first pixel group, and a correlated double sampling circuit,
wherein the first pixel group comprises a first plurality of normal pixels, a second plurality of normal pixels, and at least one first phase detection pixel, and
wherein the correlated double sampling circuit is configured to:
generate first video data, based on charges of the first plurality of normal pixels;
generate second video data, based on charges of the second plurality of normal pixels; and
generate first phase detection data, based on an output of the at least one first phase detection pixel; and
an image signal processor configured to:
apply a first weight to the first video data;
apply a second weight to the second video data; and
generate first phase detection pixel-corrected video data for the first pixel group, based on the first video data to which the first weight is applied and the second video data to which the second weight is applied,
wherein the image signal processor is further configured to:
receive image data comprising the first video data, the second video data, and the first phase detection data;
split the image data into the first video data, the second video data, and the first phase detection data; and
combine the first phase detection pixel-corrected video data and the first phase detection data.

2. The image processing device of claim 1, wherein the first plurality of normal pixels share a first floating diffusion region,
wherein the second plurality of normal pixels share a second floating diffusion region, and
wherein the at least one first phase detection pixel shares a third floating diffusion region.

3. The image processing device of claim 1, wherein the pixel array further comprises a second pixel group comprising a third plurality of normal pixels, a fourth plurality of normal pixels, and at least one second phase detection pixel, and
wherein the correlated double sampling circuit is further configured to:
generate third video data, based on the third plurality of normal pixels;

generate fourth video data, based on the fourth plurality of normal pixels; and generate second phase detection data, based on an output of the at least one second phase detection pixel.

4. The image processing device of claim 3, wherein the image signal processor is further configured to:

apply the first weight to the third video data;

apply the second weight to the fourth video data; and generate second phase detection-corrected video data for the second pixel group, based on the third video data to which the first weight is applied and the fourth video data to which the second weight is applied.

5. The image processing device of claim 1, wherein the image sensor further comprises a color filter of a first type disposed above the first plurality of normal pixels and the second plurality of normal pixels.

6. The image processing device of claim 1, wherein the image sensor further comprises:

micro lenses of a first type respectively disposed above the first plurality of normal pixels and the second plurality of normal pixels; and a micro lens of a second type disposed above the at least one first phase detection pixel.

7. The image processing device of claim 6, wherein the micro lens of the second type is larger than the micro lenses of the first type.

8. The image processing device of claim 1, further comprising an image signal processor (ISP) front end block configured to split image data that is output from the image sensor into the first video data, the second video data and the first phase detection data, wherein the image signal processor comprises:

a phase detection pixel correction block configured to perform a sum operation on the first video data to which the first weight is applied and the second video data to which the second weight is applied, to generate the first phase detection pixel-corrected video data;

a video output buffer configured to buffer the generated first phase detection pixel-corrected video data;

a phase detection processing block configured to receive the first phase detection data from the ISP front end block;

a phase detection output buffer configured to buffer the received first phase detection data; and an arbiter configured to combine the buffered first phase detection pixel-corrected video data and the buffered first phase detection data.

9. The image processing device of claim 8, wherein the arbiter is further configured to output the first phase detection pixel-corrected video data combined with the first phase detection data, in an interleave manner.

10. The image processing device of claim 1, wherein, in a first operation mode, the first weight is identical to the second weight, and wherein, in a second operation mode, the first weight is different from the second weight.

* * * * *